(12) United States Patent
Kwak et al.

(10) Patent No.: US 11,606,117 B2
(45) Date of Patent: Mar. 14, 2023

(54) FREQUENCY HOPPING PATTERN FOR RANDOM ACCESS CHANNEL PREAMBLE BASED ON COVERAGE ENHANCEMENT LEVEL

(71) Applicant: QUALCOMM Incorporated, San Diego, CA (US)

(72) Inventors: Yongjun Kwak, San Diego, CA (US); Hung Dinh Ly, San Diego, CA (US); Jing Lei, San Diego, CA (US); Yuchul Kim, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/218,092

(22) Filed: Mar. 30, 2021

(65) Prior Publication Data

US 2022/0321166 A1 Oct. 6, 2022

(51) Int. Cl.
*H04W 74/08* (2009.01)
*H04B 1/7143* (2011.01)

(52) U.S. Cl.
CPC ...... *H04B 1/7143* (2013.01); *H04W 74/0833* (2013.01)

(58) Field of Classification Search
CPC ............................ H04B 1/7143; H04W 7/0833
See application file for complete search history.

(56) References Cited

U.S. PATENT DOCUMENTS

| 10,090,880 | B2 | 10/2018 | Wang et al. | |
| 2015/0215911 | A1* | 7/2015 | Dimou | H04W 24/02 370/329 |
| 2018/0076924 | A1* | 3/2018 | Lee | H04W 72/042 |
| 2018/0160448 | A1* | 6/2018 | Blankenship | H04W 74/0833 |
| 2020/0022127 | A1* | 1/2020 | Li | H04W 72/0406 |
| 2020/0037368 | A1* | 1/2020 | Höglund | H04W 72/1294 |
| 2020/0053790 | A1* | 2/2020 | Shin | H04W 74/006 |
| 2020/0187245 | A1* | 6/2020 | Fujishiro | H04W 4/70 |
| 2020/0252972 | A1* | 8/2020 | Rico Alvarino | H04W 74/0833 |

(Continued)

FOREIGN PATENT DOCUMENTS

WO 2017105693 A1 6/2017

OTHER PUBLICATIONS

Huawei, et al., "Summary of Informal email Discussion for 'Physical Layer Aspects of Random Access Transmission'", 3GPP TSG RAN WG1 Meeting #83, R1-157512_EMTC-11, 3rd Generation Partnership Project, Mobile Competence Centre, 650, Route Des Lu, vol. RAN WG1, No. Anaheim, USA, Nov. 15, 2015-Nov. 22, 2015, Nov. 17, 2015, XP051001065, 43 Pages.

(Continued)

*Primary Examiner* — Jaison Joseph

(74) *Attorney, Agent, or Firm* — Muncy, Geissler, Olds & Lowe, P.C./Qualcomm

(57) ABSTRACT

Disclosed are techniques for wireless communication. In an aspect, a UE determines a frequency hopping pattern for transmission of a physical random access channel (PRACH) preamble based on an associated PRACH coverage enhancement (CE) level, and transmits the PRACH preamble in accordance with the frequency hopping pattern and the associated PRACH CE level. A base station receives the PRACH preamble, and transmits a response (e.g., Msg2 or MsgA) to the PRACH preamble.

25 Claims, 16 Drawing Sheets

(56) References Cited

U.S. PATENT DOCUMENTS

| | | | |
|---|---|---|---|
| 2021/0022143 A1* | 1/2021 | Xiong | H04L 5/0051 |
| 2021/0058971 A1* | 2/2021 | MolavianJazi | H04B 17/318 |
| 2021/0076384 A1* | 3/2021 | MolavianJazi | H04W 72/0446 |
| 2021/0112590 A1* | 4/2021 | Kim | H04W 76/27 |
| 2021/0195652 A1* | 6/2021 | Taherzadeh Boroujeni | H04W 74/0833 |
| 2021/0251016 A1* | 8/2021 | Xiong | H04W 74/008 |
| 2021/0259021 A1* | 8/2021 | Huang | H04W 74/0833 |
| 2021/0315016 A1* | 10/2021 | Taherzadeh Boroujeni | H04W 74/008 |
| 2021/0352735 A1* | 11/2021 | Bae | H04L 1/08 |
| 2021/0377929 A1* | 12/2021 | Li | H04L 5/0037 |
| 2021/0410192 A1* | 12/2021 | Ly | H04W 74/0833 |
| 2022/0039068 A1* | 2/2022 | Hoglund | H04W 74/008 |

OTHER PUBLICATIONS

International Search Report and Written Opinion—PCT/US2022/070840—ISA/EPO—dated Jun. 14, 2022.
Nokia Networks, et al., "PRACH Performance Requirements for Supporting Cat-M UEs", R4-160269, 3GPP TSG-RAN WG4 Meeting #78, CAT-M Prach Performance Requirements, 3rd Generation Partnership Project, Mobile Competence Centre, 650, Route Des Lucioles, F-06921, Sophia-Antipolis Cedex, France, vol. RAN WG4, No. St. Julian's, Malta, Feb. 15, 2016-Feb. 19, 2016, Feb. 8, 2016, XP051067694, 3 Pages.
Samsung: "RA Preamble Transmission", R1-155438, 3GPP TSG RAN WG1 #82bis, RA Preamble, 3rd Generation Partnership Project, Mobile Competence Centre, 650, Route Des Lucioles, F-06921, Sophia-Antipolis Cedex, France, vol. RAN WG1, No. Malmo, Sweden, Oct. 5, 2015-Oct. 9, 2015, Sep. 26, 2015, XP051021606, pp. 1-3.

* cited by examiner

FREQUENCY HOPPING PATTERN FOR RANDOM ACCESS CHANNEL PREAMBLE BASED ON COVERAGE ENHANCEMENT LEVEL

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Upcoming releases of NR have contemplated the adoption of a new UE class characterized as 'NR-Superlight', which is associated with capabilities that are further reduced relative to RedCap UEs as described above. NR-Superlight UEs may utilize low-power modes of operation and low-complexity signaling (e.g., low-complexity sidelink signaling). Upcoming releases of NR may define improvements in coverage, complexity, power consumption, and/or the like, which may be beneficial for UEs that support low power wide area (LPWA) uses cases, such as NR-Superlight UEs. NR-Superlight UEs that support the LPWA use cases may include metering devices, asset tracking devices, personal IoT devices, and/or the like.

In 3GPP Rel. 16, eMBB or URLLC UEs are expected to support 100 MHz bandwidth (BW). In 3GPP Rel. 17, RedCap UEs are expected to support 20 MHz BW. In upcoming releases of NR such as 3GPP Rel. 17, NR-Superlight UEs may be expected to support a BW that is smaller than 20 MHz, such as 5 MHz. Such UEs may benefit from repetitive PRACH transmission for coverage enhancement (CE).

In some designs, the bandwidth (BW) (e.g., 5 MHz) associated with each PRACH CE level may be sufficient to support frequency diversity gain. In this case, transmission of the PRACH preamble may benefit from intra-band frequency hopping (e.g., inside of a respective 5 MHz band), inter-band frequency hopping (e.g., between 5 MHz bands), or a combination thereof. Because the repetition level per PRACH CE level may be different, the frequency hopping pattern may be defined per PRACH CE level in some designs. Such aspects may provide various technical advantages, such as improved RACH procedures for BW-limited UEs, such as NR-Superlight UEs.

In an aspect of the disclosure, a method, a computer-readable medium, and an apparatus are provided. The apparatus may be a UE. The UE may determine a frequency hopping pattern for transmission of a first physical random access channel (PRACH) preamble based on an associated PRACH coverage enhancement (CE) level, and may transmit the first PRACH preamble in accordance with the frequency hopping pattern and the associated PRACH CE level.

In another aspect of the disclosure, a method, a computer-readable medium, and an apparatus are provided. The apparatus may be a BS. The BS may receive, from a UE, a PRACH preamble with a frequency hopping pattern that is based on an associated PRACH CE level, and may transmit, to the UE, a response to the PRACH preamble.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
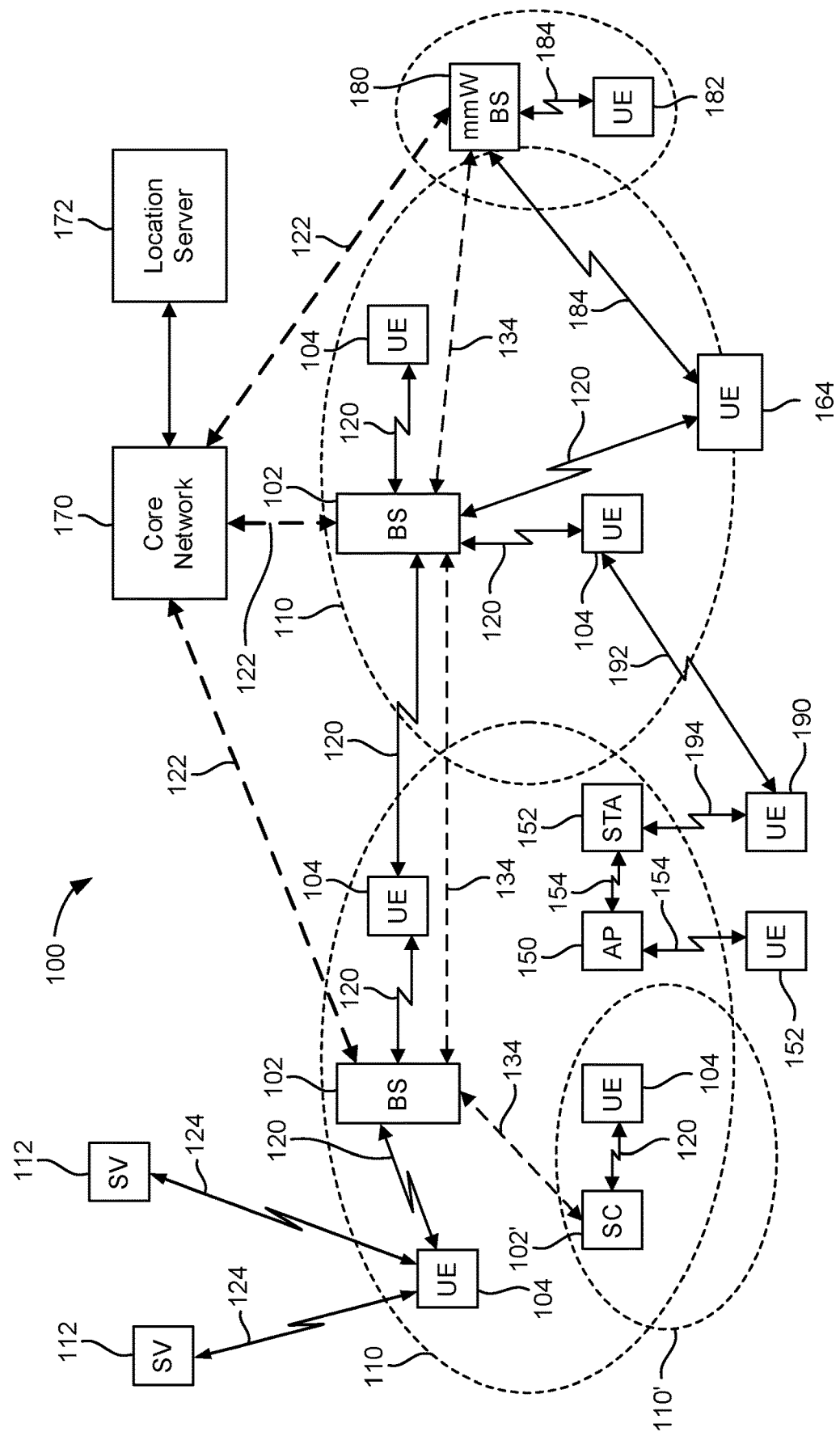
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
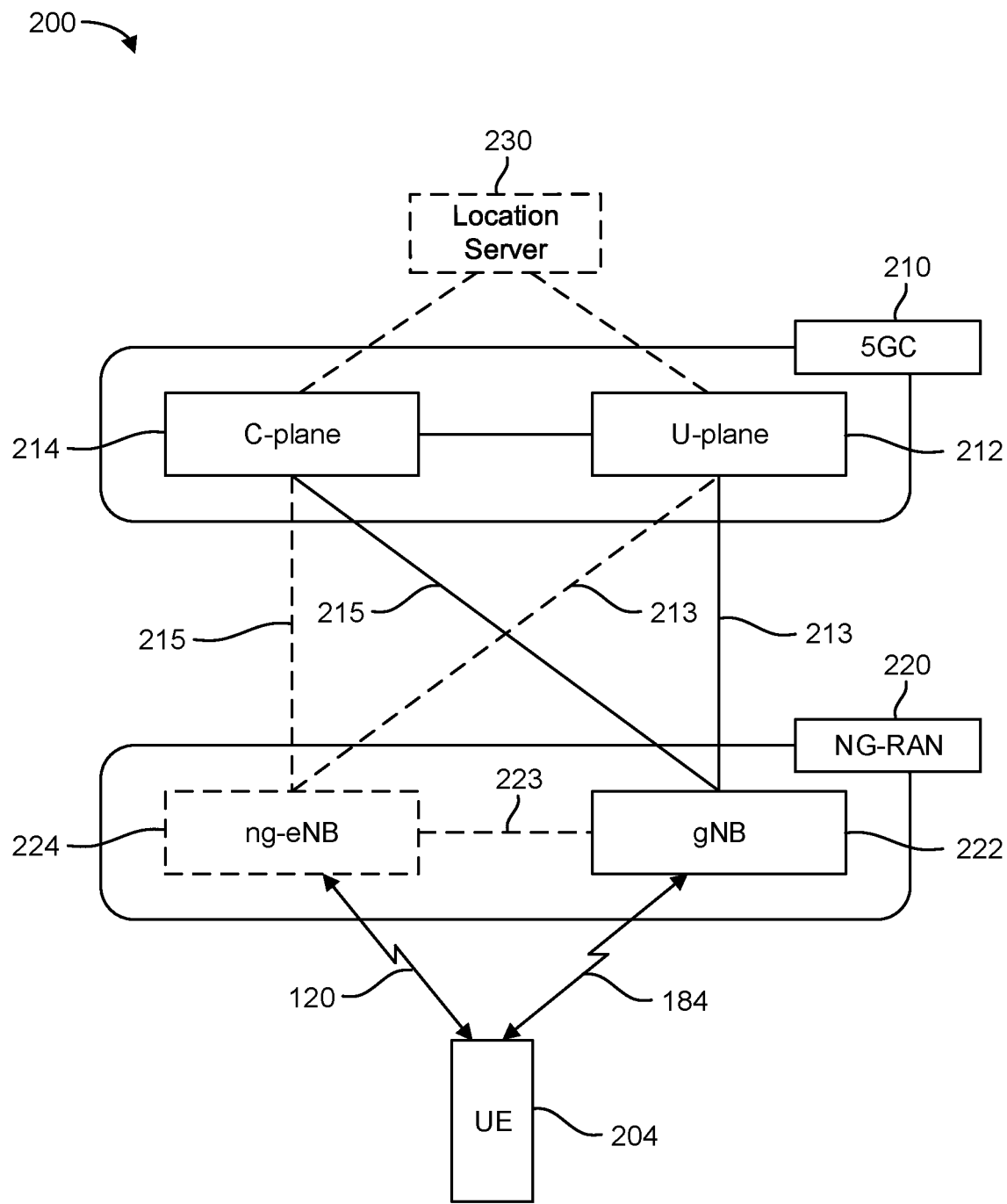
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
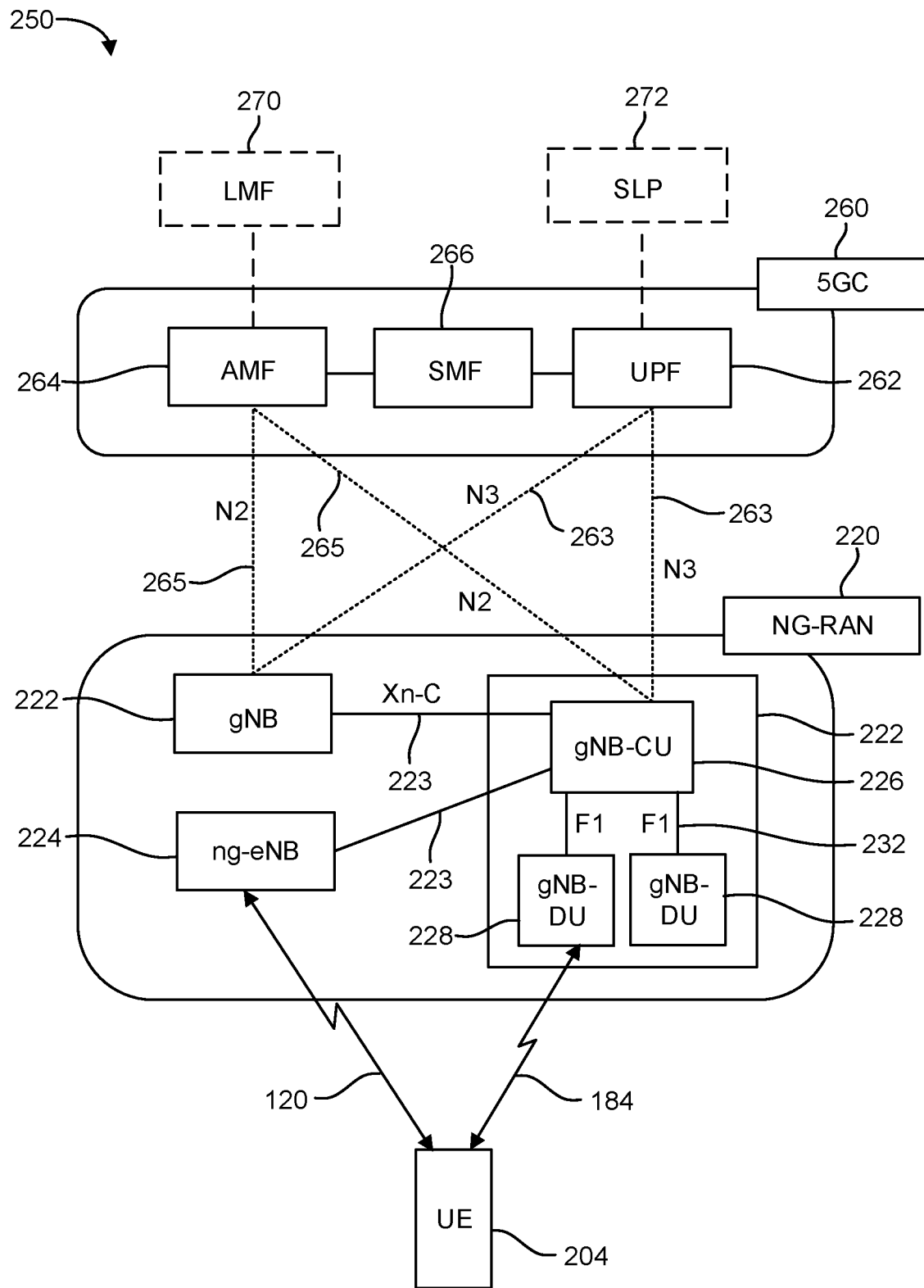

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204

(e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
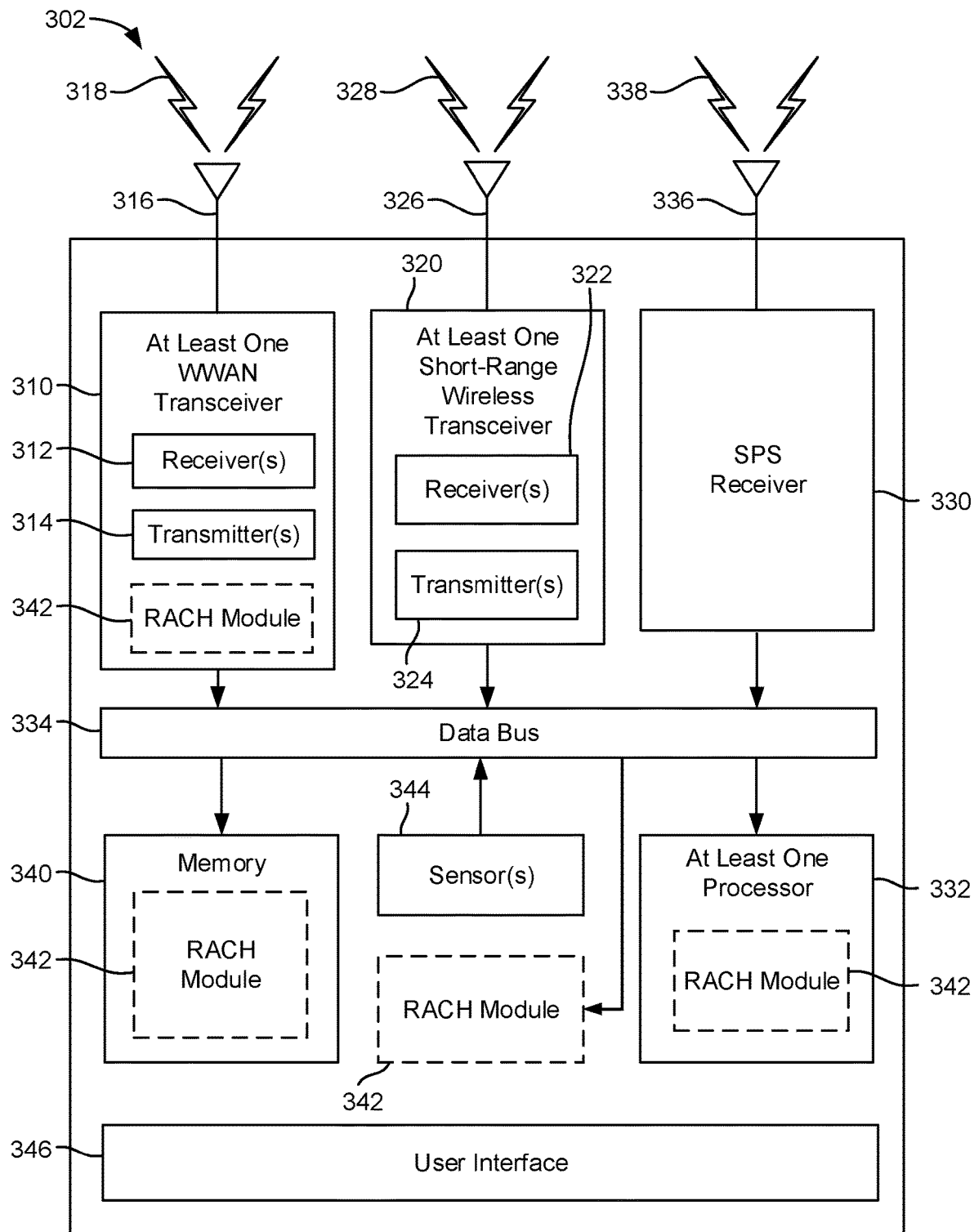
FIGS. 3A to 3C are simplified block diagrams of several sample aspects of components that may be employed in a user equipment (UE), a base station, and a network entity, respectively, and configured to support communications as taught herein.
Figure 3B:
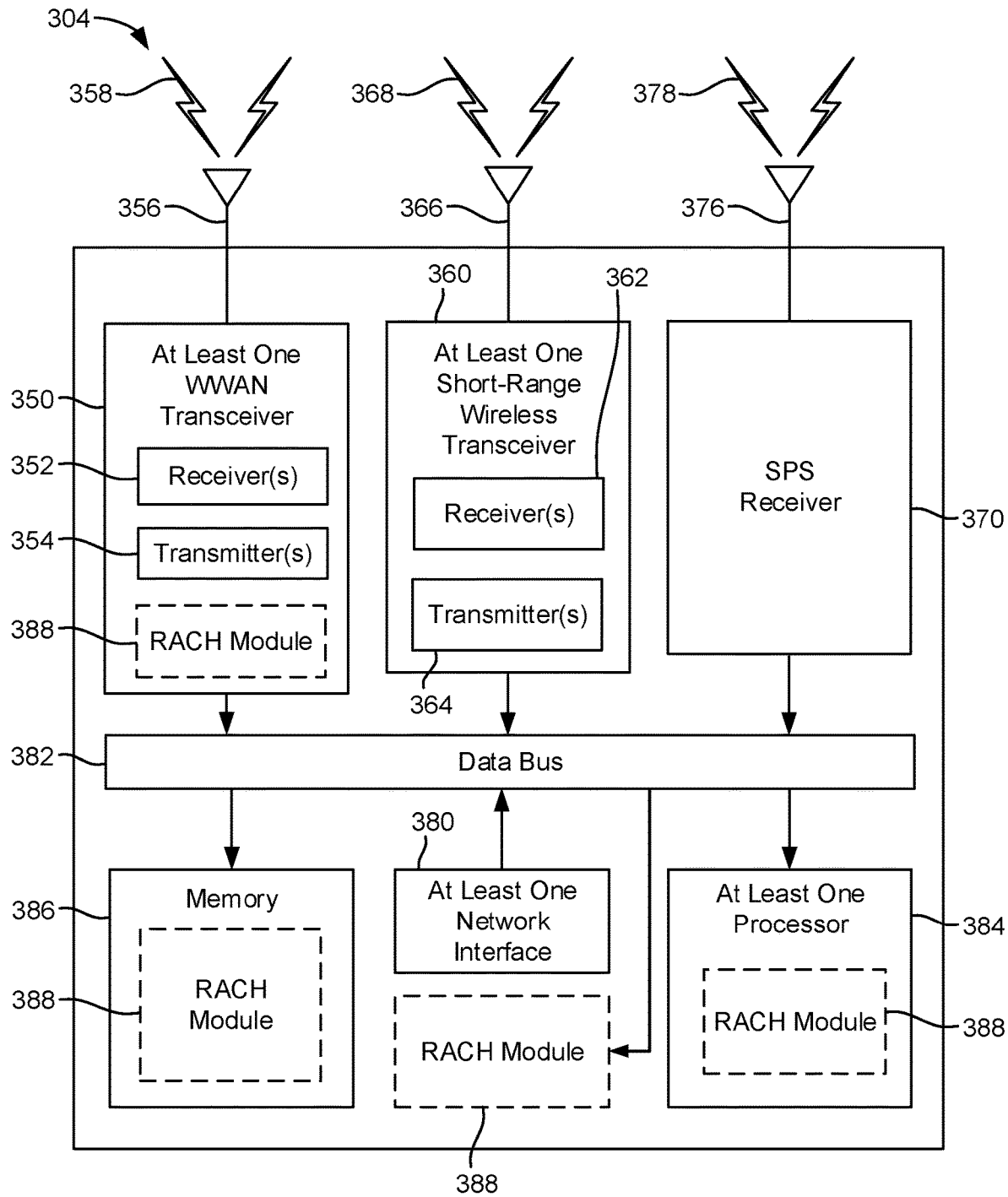
Figure 3C:
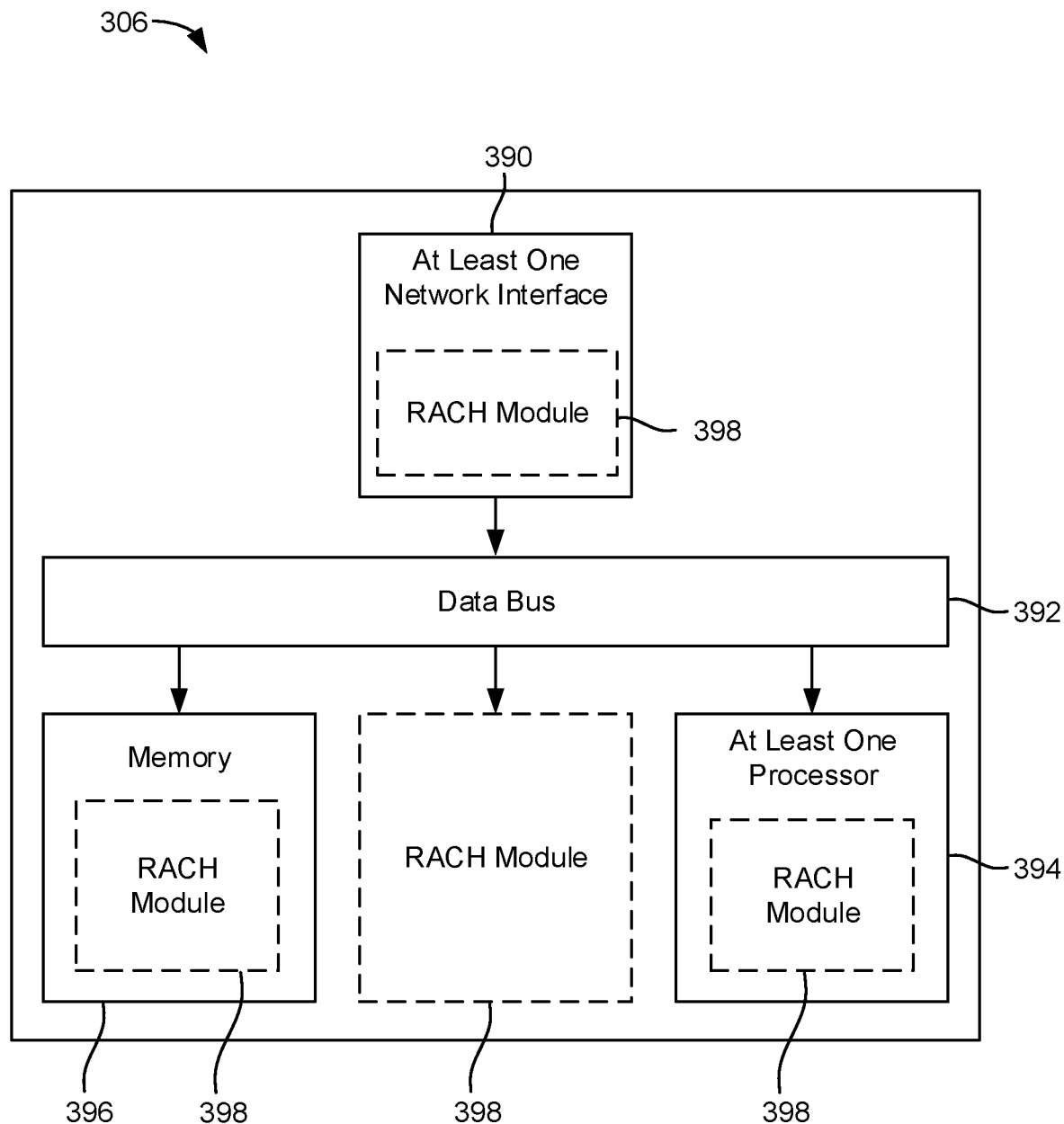

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include at least one wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, at least one short-range wireless transceiver 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interface 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

In an aspect, the at least one WWAN transceiver 310 and/or the at least one short-range wireless transceiver 320 may form a (wireless) communication interface of the UE 302. Similarly, the at least one WWAN transceiver 350, the at least one short-range wireless transceiver 360, and/or the at least one network interface 380 may form a (wireless) communication interface of the base station 304. Likewise, the at least one network interface 390 may form a (wireless) communication interface of the network entity 306. The various wireless transceivers (e.g., transceivers 310, 320, 350, and 360) and wired transceivers (e.g., network interfaces 380 and 390) may generally be characterized as at least one transceiver, or alternatively, as at least one communication interface. As such, whether a particular transceiver or communication interface relates to a wired or wireless transceiver or communication interface, respectively, may be inferred from the type of communication performed (e.g., a backhaul communication between network devices or servers will generally relate to signaling via at least one wired transceiver).

The UE 302, the base station 304, and the network entity 306 also include other components that may be used in conjunction with the operations as disclosed herein. The UE 302, the base station 304, and the network entity 306 include at least one processor 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, at least one general purpose processor, multi-core processor, central processing unit (CPU), ASIC, digital signal processor (DSP), field programmable gate array (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include RACH Modules 342, 388, and 398, respectively. The RACH Modules 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the RACH Modules 342, 388, and 398 may be external to the processors 332, 384, and 394 (e.g., part of a modem processing system, integrated with another processing system, etc.). Alternatively, the RACH Modules 342, 388, and 398 may be memory modules stored in the memory components 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the RACH Module 342, which may be, for example, part of the at least one WWAN transceiver 310, the memory component 340, the at least one processor 332, or any combination thereof, or may be a standalone component. FIG. 3B illustrates possible locations of the RACH Module 388, which may be, for example, part of the at least one WWAN transceiver 350, the memory component 386, the at least one processor 384, or any combination thereof, or may be a standalone component. FIG. 3C illustrates possible locations of the RACH Module 398, which may be, for example, part of the at least one network interface 390, the memory component 396, the at least one processor 394, or any combination thereof, or may be a standalone component.

The UE 302 may include one or more sensors 344 coupled to the at least one processor 332 to provide means for sensing or detecting movement and/or orientation information that is independent of motion data derived from signals received by the at least one WWAN transceiver 310, the at least one short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the at least one processor 384 in more detail, in the downlink, IP packets from the network entity 306 may be provided to the at least one processor 384. The at least one processor 384 may implement functionality for an RRC layer, a packet data convergence protocol (PDCP) layer, a radio link control (RLC) layer, and a medium access control (MAC) layer. The at least one processor 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the at least one processor 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the at least one processor 332, which implements Layer-3 (L3) and Layer-2 (L2) functionality.

In the uplink, the at least one processor 332 provides demultiplexing between transport and logical channels, packet reassembly, deciphering, header decompression, and control signal processing to recover IP packets from the core network. The at least one processor 332 is also responsible for error detection.

Similar to the functionality described in connection with the downlink transmission by the base station 304, the at least one processor 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the at least one processor 384.

In the uplink, the at least one processor 384 provides demultiplexing between transport and logical channels, packet reassembly, deciphering, header decompression, control signal processing to recover IP packets from the UE 302. IP packets from the at least one processor 384 may be provided to the core network. The at least one processor 384 is also responsible for error detection.

For convenience, the UE 302, the base station 304, and/or the network entity 306 are shown in FIGS. 3A to 3C as including various components that may be configured according to the various examples described herein. It will be appreciated, however, that the illustrated components may have different functionality in different designs.

The various components of the UE 302, the base station 304, and the network entity 306 may communicate with each other over data buses 334, 382, and 392, respectively. In an aspect, the data buses 334, 382, and 392 may form, or be part of, the communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A to 3C may be implemented in various ways. In some implementations, the components of FIGS. 3A to 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memory components 340, 386, and 396, the RACH Modules 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

In order to establish uplink synchronization and a radio resource control (RRC) connection with a base station (or more specifically, a serving cell/TRP), a UE needs to perform a random access procedure (also referred to as a random access channel (RACH) procedure or a physical random access channel (PRACH) procedure). There are two types of random access available in NR, contention based random access (CBRA), also referred to as "four-step" random access, and contention free random access (CFRA), also referred to as "three-step" random access. There is also a "two-step" random access procedure that may be performed instead of the four-step random access procedure in certain cases.

Figure 4:
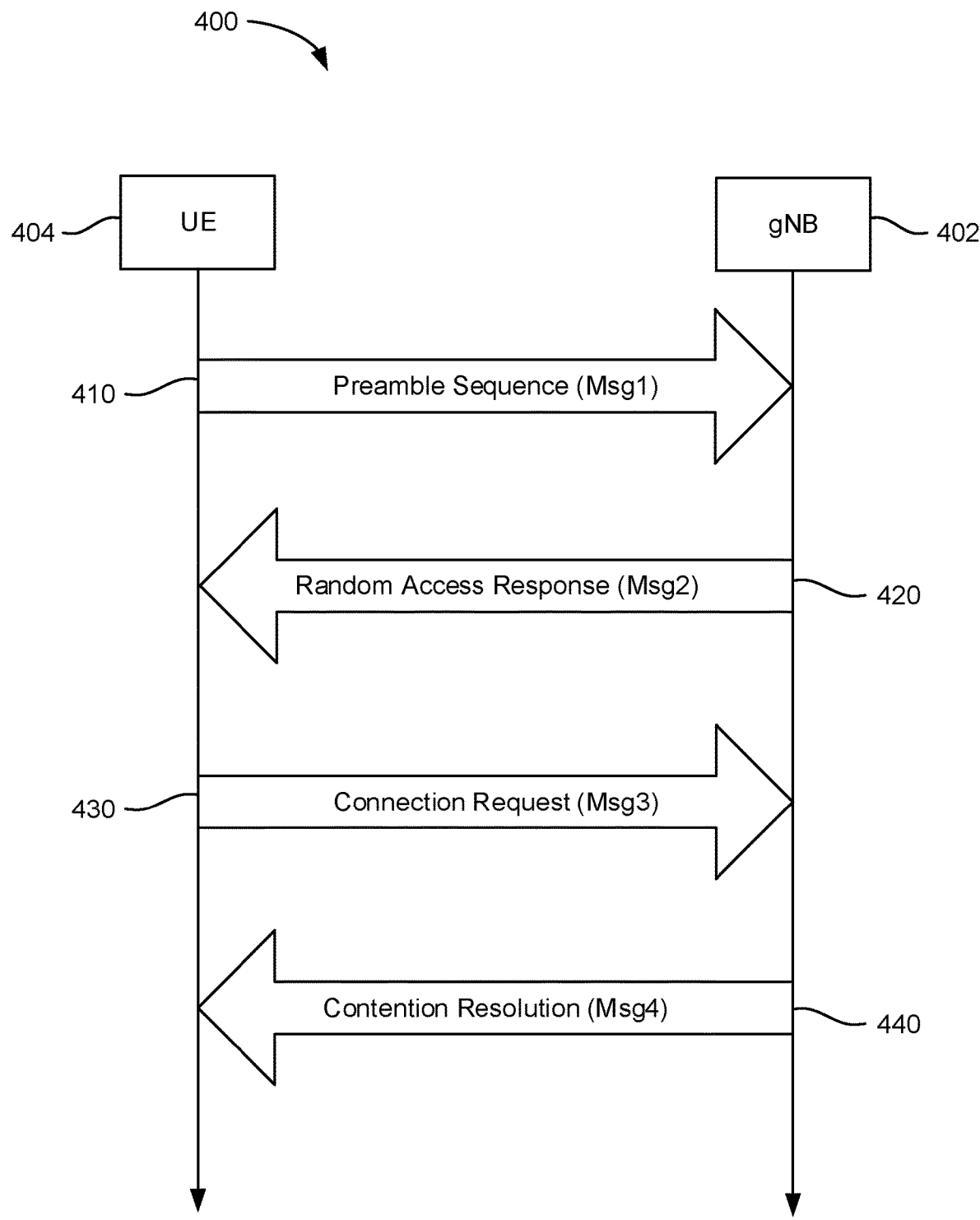
FIG. 4 illustrates an example four-step random access procedures, according to aspects of the disclosure.

FIG. 4 illustrates an example four-step random access procedure 400, according to aspects of the disclosure. The four-step random access procedure 400 is performed between a UE 404 and a base station 402 (illustrated as a gNB), which may correspond to any of the UEs and base stations, respectively, described herein.

There are various situations in which a UE 404 may perform the four-step random access procedure 400. For example, a UE 404 may perform the four-step random access procedure 400 when performing an initial RRC connection setup (i.e., acquiring initial network access after coming out of the RRC IDLE state), when performing an RRC connection re-establishment procedure, when the UE 404 has uplink data to transmit, when the UE 404 has uplink data to transmit and the UE 404 is in an RRC CONNECTED state but there are no PUCCH resources available for a scheduling request (SR), or when there is a scheduling request failure.

Before performing the four-step random access procedure 400, the UE 404 reads one or more synchronization signal blocks (SSBs) broadcasted by the base station 402 with which the UE 404 is performing the four-step random access procedure 400. In NR, each beam transmitted by a base station (e.g., base station 402) is associated with a different SSB, and a UE (e.g., UE 404) selects a certain beam to use to communicate with the base station 402. Based on the SSB of the selected beam, the UE 404 can then read the system information block (SIB) type 1 (SIB1), which carries cell access related information and supplies the UE 404 with the scheduling of other system information blocks transmitted on the selected beam.

When the UE 404 sends the very first message of the four-step random access procedure 400 to the base station 402, it sends a specific pattern called a "preamble" (also referred to as a "RACH preamble," a "PRACH preamble," a "sequence"). The preamble differentiates requests from different UEs 404. In CBRA, a UE 404 selects a preamble randomly from a pool of preambles (64 in NR) shared with other UEs 404. However, if two UEs 404 use the same preamble at the same time, then there can be a collision, or contention.

Thus, at 410, the UE 404 selects one of the 64 preambles to send to the base station 402 as a RACH request (also referred to as a "random access request"). This message is referred to as "Message 1" or "Msg1" in a four-step random access procedure 400. Based on the synchronization information from the base station 402 (e.g., the SIB1), the UE 404 sends the preamble at the RACH occasion (RO) corresponding to the selected SSB/beam. More specifically, in order for the base station 402 to determine which beam the UE 404 has selected, a specific mapping is defined between an SSB and an RO (which occur every 10, 20, 40, 80, or 160 ms). By detecting at which RO the UE 404 sent the preamble, the base station 402 can determine which SSB/beam the UE 404 selected.

Note that an RO is a time-frequency transmission opportunity for transmitting a preamble, and a preamble index (i.e., a value from 0 to 63 for the 64 possible preambles) enables the UE 404 to generate the type of preamble expected at the base station 402. The RO and preamble index may be configured to the UE 404 by the base station 402 in a SIB. A RACH resource is an RO in which one preamble index is transmitted. As such, the terms "RO" (or "RACH occasion") and "RACH resource" may be used interchangeably, depending on the context.

Due to reciprocity, the UE 404 may use the uplink transmit beam corresponding to the best downlink receive beam determined during synchronization (i.e., the best receive beam to receive the selected downlink beam from the base station 402). That is, the UE 404 uses the parameters of the downlink receive beam used to receive the SSB beam from the base station 402 to determine the parameters of the uplink transmit beam. If reciprocity is available at the base station 402, the UE 404 can transmit the preamble over one beam. Otherwise, the UE 404 repeats transmission of the same preamble on all of its uplink transmit beams.

The UE 404 also needs to provide its identity to the network (via base station 402) so that the network can address it in the next step. This identity is called the random access radio network temporary identity (RA-RNTI) and is determined from the time slot in which the preamble is sent.

If the UE 404 does not receive a response from the base station 402 within some period of time, it increases its transmission power by a fixed step and sends the preamble/Msg1 again. More specifically, the UE 404 transmits a first set of repetitions of the preamble, then, if it does not receive a response, it increases its transmission power and transmits a second set of repetitions of the preamble. The UE 404 continues increasing its transmit power in incremental steps until it receives a response from the base station 402.

At 420, the base station 402 sends a random access response (RAR), referred to as a "Message 2" or "Msg2" in a four-step random access procedure 400, to the UE 404 on the selected beam. The RAR is sent on a physical downlink shared channel (PDSCH) and is addressed to the RA-RNTI calculated from the time slot (i.e., RO) in which the preamble was sent. The RAR carries the following information: a cell-radio network temporary identifier (C-RNTI), a timing advance (TA) value, and an uplink grant resource. The base station 402 assigns the C-RNTI to the UE 404 to enable further communication with the UE 404. The TA value specifies how much the UE 404 should change its timing to compensate for the propagation delay between the UE 404 and the base station 402. The uplink grant resource indicates the initial resources the UE 404 can use on the physical uplink shared channel (PUSCH). After this step, the UE 404 and the base station 402 establish coarse beam alignment that can be utilized in the subsequent steps.

At 430, using the allocated PUSCH, the UE 404 sends an RRC connection request message, referred to as a "Message 3" or "Msg3," to the base station 402. Because the UE 404 sends the Msg3 over the resources scheduled by the base station 402, the base station 402 knows from where (spatially) to detect the Msg3 and therefore which uplink receive beam should be used. Note that the Msg3 PUSCH can be sent on the same or different uplink transmit beam as the Msg1.

The UE 404 identifies itself in the Msg3 by the C-RNTI assigned in the previous step. The message contains the UE's 404 identity and connection establishment cause. The UE's 404 identity is either a temporary mobile subscriber identity (TMSI) or a random value. A TMSI is used if the UE 404 has previously connected to the same network. The UE 404 is identified in the core network by the TMSI. A random value is used if the UE 404 is connecting to the network for the very first time. The reason for the random value or TMSI is that the C-RNTI may have been assigned to more than one UE 404 in the previous step, due to multiple requests arriving at the same time. The connection establishment cause indicates the reason why the UE 404 needs to connect to the network (e.g., for a positioning session, because it has uplink data to transmit, because it received a page from the network, etc.).

As noted above, the four-step random access procedure 400 is a CBRA procedure. Thus, as described above, any UE 404 connecting to the same base station 402 can send the same preamble at 410, in which case, there is a possibility of collision, or contention, among the requests from the various UEs 404. Accordingly, the base station 402 uses a contention resolution mechanism to handle this type of access request. In this procedure, however, the result is random and not all random access succeeds.

Thus, at 440, if the Msg3 was successfully received, the base station 402 responds with a contention resolution message, referred to as a "Message 4" or "Msg4." This message is addressed to the TMSI or random value (from the Msg3) but contains a new C-RNTI that will be used for further communication. Specifically, the base station 402 sends the Msg4 in the PDSCH using the downlink transmit beam determined in the previous step.

As shown in FIG. 4, the four-step random-access procedure 400 requires two round-trip cycles between the UE 404 and the base station 402, which not only increases latency but also incurs additional control signaling overhead. To address these issues, two-step random access has been introduced in NR for CBRA. The motivation behind two-step random access is to reduce latency and control signaling overhead by having a single round trip cycle between a UE and a base station. This is achieved by combining the preamble (Msg1) and the scheduled PUSCH transmission (Msg3) into a single message from the UE to the base station, known as "MsgA." Similarly, the random access response (Msg2) and the contention resolution message (Msg4) are combined into a single message from the base station to the UE, known as "MsgB." This reduces latency and control signaling overhead.

Figure 5:
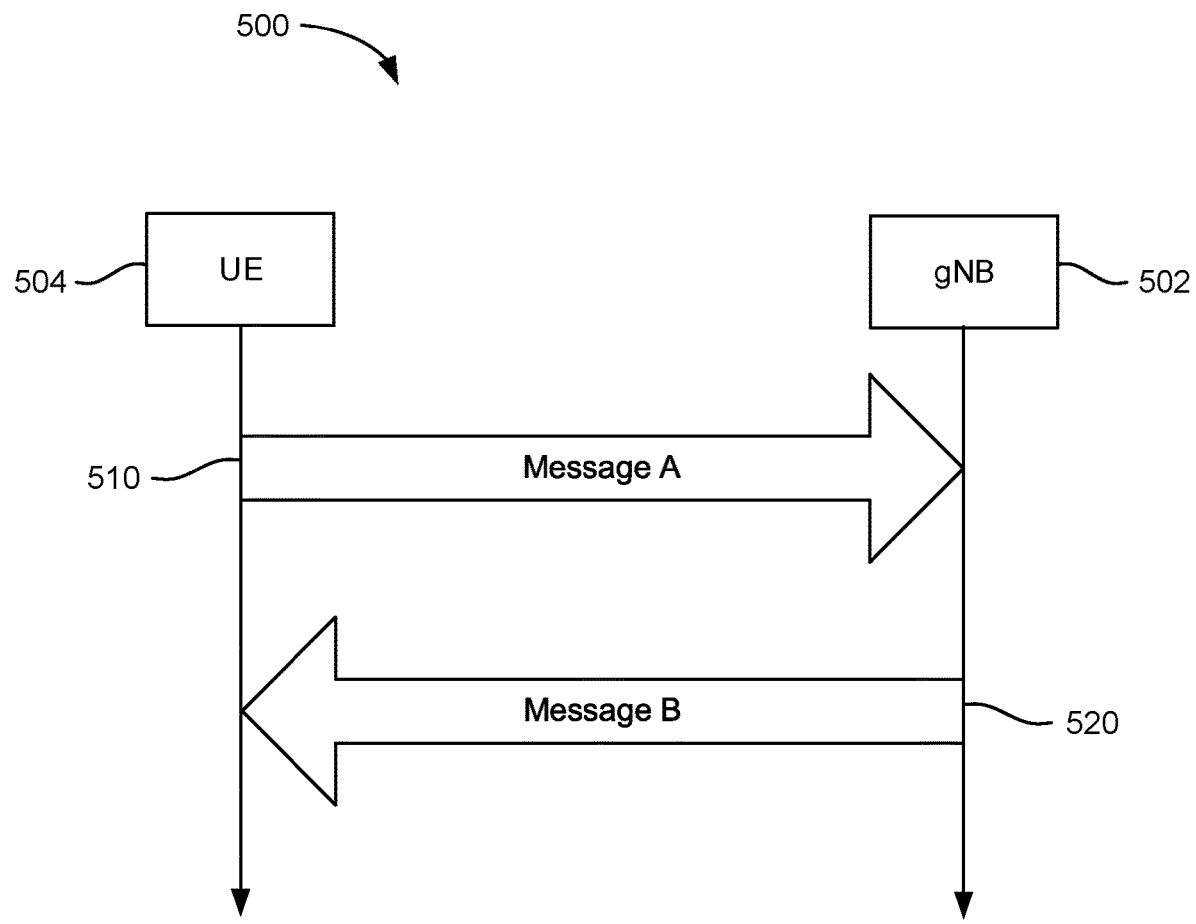
FIG. 5 illustrates an example two-step random access procedure, according to aspects of the disclosure.

FIG. 5 illustrates an example two-step random access procedure 500, according to aspects of the disclosure. The two-step random access procedure 500 may be performed between a UE 504 and a base station 502 (illustrated as a gNB), which may correspond to any of the UEs and base stations, respectively, described herein.

At 510, the UE 504 transmits a RACH Message A ("MsgA") to the base station 502. In a two-step random access procedure 500, Msg1 and Msg3, described above with reference to FIG. 4, are collapsed (i.e., combined) into a MsgA and sent to the base station 502. As such, a MsgA includes a preamble (called a "PRACH preamble") and a PUSCH similar to the Msg3 PUSCH of a four-step random access procedure 400. The preamble may have been selected from the 64 possible preambles, as described above with reference to FIG. 4, and may be used as a reference signal for demodulating the data transmitted in the MsgA. At 520, the UE 504 receives a RACH Message B ("MsgB") from the base station 502. The MsgB may be a combination of Msg2 and Msg4 described above with reference to FIG. 4.

The combination of Msg1 and Msg3 into one MsgA and the combination of Msg2 and Msg4 into one MsgB allows the UE 504 to reduce the RACH procedure setup time to support the low-latency requirements of NR. Although the UE 504 may be configured to support the two-step random access procedure 500, the UE 504 may still support the four-step random access procedure 400 as a fall back if the UE 504 is not able to use the two-step random access procedure 500 due to some constraints (e.g., high transmit power requirements, etc.). Therefore, a UE 504 in NR may be configured to support both the four-step and the two-step random access procedures 400 and 500, and may determine which random access procedure to use based on the RACH configuration information received from the base station 502.

As noted above, various device types may be characterized as UEs. Starting in 3GPP Rel. 17, a number of these UE types (so-called low-tier UEs) are being allocated a new UE classification denoted as Reduced Capability ('RedCap') or 'NR-Light'. Examples of UE types that fall under the RedCap classification include wearable devices (e.g., smart watches, etc.), industrial sensors, video cameras (e.g., surveillance cameras, etc.), and so on. Generally, the UE types grouped under the RedCap classification are associated with lower communicative capacity. For example, relative to 'normal' UEs (e.g., UEs not classified as RedCap), RedCap UEs may be limited in terms of maximum bandwidth (e.g., 20 MHz, etc.), maximum transmission power (e.g., 20 dBm, 14 dBm, etc.), number of receive antennas (e.g., 1 receive antenna, 2 receive antennas, etc.), and so on. Some RedCap UEs may also be sensitive in terms of power consumption (e.g., requiring a long battery life, such as several years) and may be highly mobile. Moreover, in some designs, it is generally desirable for RedCap UEs to co-exist with UEs implementing protocols such as eMBB, URLLC, LTE NB-IoT/MTC, and so on.

Upcoming releases of NR have contemplated the adoption of a new UE class characterized as 'NR-Superlight', which is associated with capabilities that are further reduced relative to RedCap UEs as described above. NR-Superlight UEs may utilize low-power modes of operation and low-complexity signaling (e.g., low-complexity sidelink signaling). Upcoming releases of NR may define improvements in coverage, complexity, power consumption, and/or the like, which may be beneficial for UEs that support low power wide area (LPWA) uses cases, such as NR-Superlight UEs. NR-Superlight UEs that support the LPWA use cases may include metering devices, asset tracking devices, personal IoT devices, and/or the like.

In 3GPP Rel. 16, eMBB or URLLC UEs are expected to support 100 MHz bandwidth (BW). In 3GPP Rel. 17, RedCap UEs are expected to support 20 MHz BW. In upcoming releases of NR such as 3GPP Rel. 17, NR-Superlight UEs may be expected to support a BW that is smaller than 20 MHz, such as 5 MHz. Such UEs may benefit from repetitive PRACH transmission for coverage enhancement (CE), as described below with respect to FIG. 6.

Figure 6:
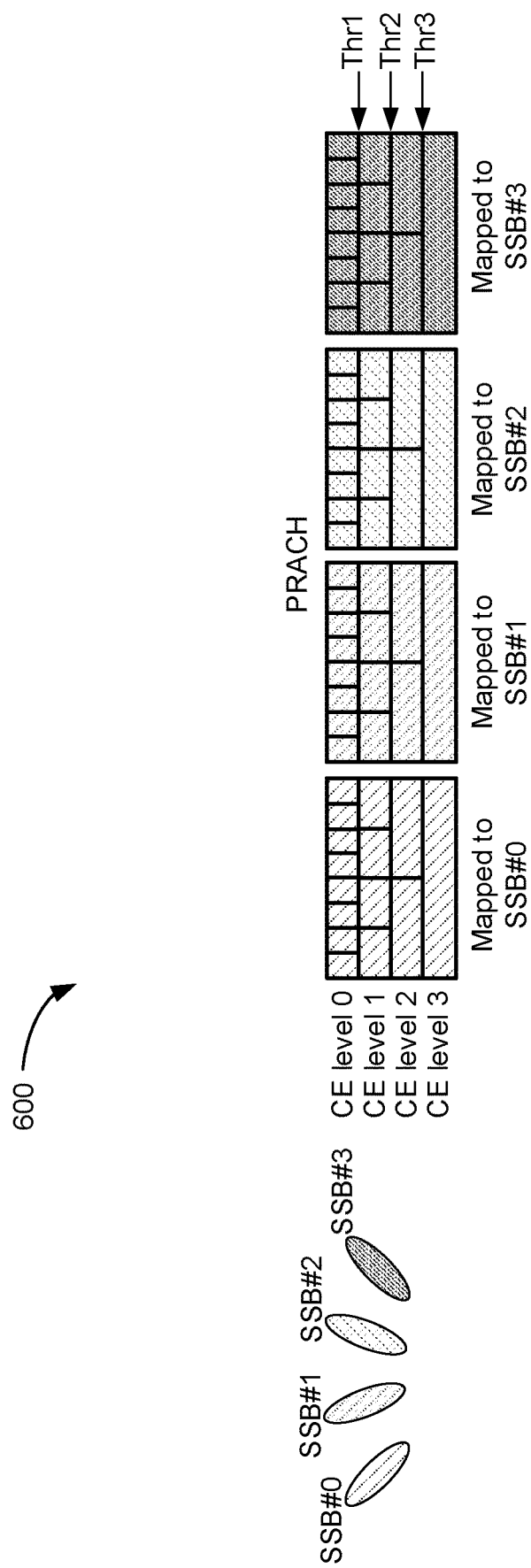
FIG. 6 is a diagram illustrating an example of random access channel transmissions using resources associated with SSBs, in accordance with various aspects of the present disclosure.

FIG. 6 is a diagram illustrating an example 600 of random access channel transmissions using resources associated with SSBs, in accordance with various aspects of the present disclosure.

As shown in FIG. 6, a first SSB (SSB #0) may be mapped to first PRACH resources, a second SSB (SSB #1) may be mapped to second PRACH resources, a third SSB (SSB #2) may be mapped to third PRACH resources, and a fourth SSB (SSB #3) may be mapped to fourth PRACH resources.

The first PRACH resources may be associated with a plurality of PRACH CE levels (e.g., four different PRACH CE levels). For example, the first PRACH resources may be associated with a first PRACH CE level (CE level 0), a second PRACH CE level (CE level 1), a third PRACH CE level (CE level 2), and a fourth PRACH CE level (CE level 3). A PRACH CE level may be associated with a number of PRACH repetitions. For example, the first PRACH CE level may be associated with one PRACH repetition, the second PRACH CE level may be associated with two PRACH repetitions, the third PRACH CE level may be associated with four PRACH repetitions, and the fourth PRACH CE level may be associated with eight PRACH repetitions.

Similarly, the second, third, and fourth PRACH resources may be associated with the plurality of PRACH CE levels. For example, each of the second, third, and fourth PRACH resources may be associated with the first, second, third, and fourth PRACH CE levels.

In one example, a set of power measurement thresholds (e.g., RSRP measurement thresholds) may be associated with the plurality of PRACH CE levels. For example, a first power measurement threshold (Thr1), a second power measurement threshold (Thr2), and a third power measurement threshold (Thr3) may be associated with one or more of the first, second, third, and fourth PRACH CE levels.

In the example shown in FIG. 6, a same number of PRACH CE levels may be defined for each SSB, and the set of power measurement thresholds may be commonly applied to the plurality of SSBs (e.g., the four SSBs). In other designs, a different number of PRACH CE levels may be defined for at least some of the SSBs. In this example, a PRACH resource partitioning may be based at least in part on a joint configuration for the SSB(s) and the PRACH CE levels.

In some designs, the bandwidth (BW) (e.g., 5 MHz) is associated with each PRACH CE level. To have frequency diversity gain, transmission of the PRACH preamble may benefit from intra-band frequency hopping (e.g., inside of a respective 5 MHz band), inter-band frequency hopping (e.g., between 5 MHz bands), or a combination thereof. Because the repetition level per PRACH CE level may be different, the frequency hopping pattern may be defined per PRACH CE level in some designs. Such aspects may provide various technical advantages, such as improved RACH procedures for BW-limited UEs, such as NR-Superlight UEs.

Figure 7:
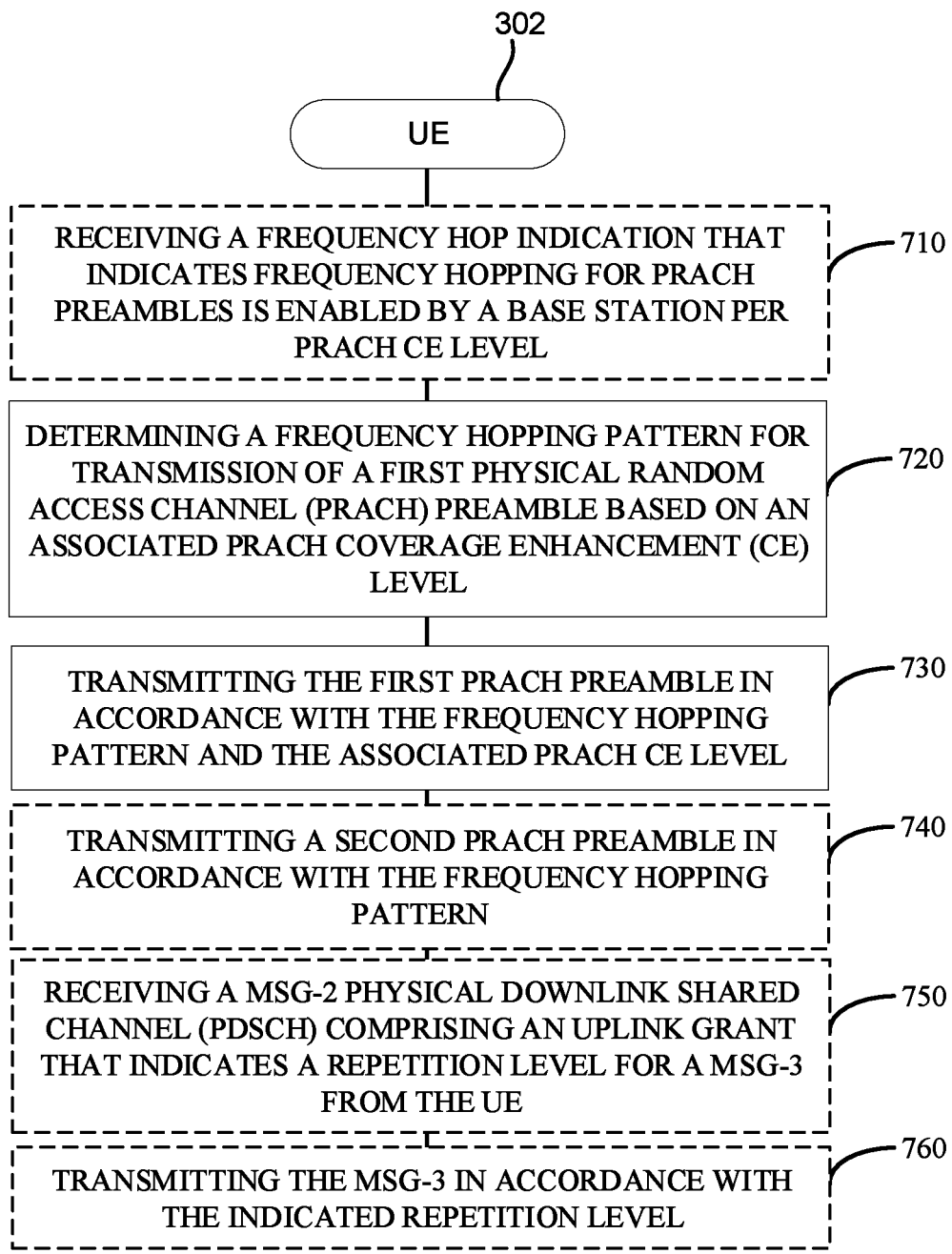
FIG. 7 illustrates an exemplary process of communications according to an aspect of the disclosure.

FIG. 7 illustrates an exemplary process 700 of communications according to an aspect of the disclosure. The process 700 of FIG. 7 is performed by a UE, which may correspond to UE 302 as an example.

Referring to FIG. 7, at 710, UE 302 (e.g., receiver 312 or 322, etc.) optionally receives a frequency hop indication that indicates frequency hopping for PRACH preambles is enabled by a base station per PRACH CE level. In an example, the frequency hop indication is received in a system information block (SIB) from the base station. In a more specific example, the SIB corresponds to a SIB1 or a SIB associated with a class of the UE (e.g., SIB specific to NR-Superlight UEs, etc.). In some designs, if the frequency hop indication is not received or does not indicate that frequency hopping is enabled, then UE 302 may perform the RACH procedure at a respective PRACH CE level without frequency hopping. In an example, the frequency hop indication may be optional in some designs because UE 302 may alternatively assume that PRACH preamble frequency hopping per PRACH CE level is enabled.

Referring to FIG. 7, at 720, UE 302 (e.g., processing system 332, RACH Module 342, etc.) determines a frequency hopping pattern for transmission of a first PRACH preamble based on an associated PRACH CE level. For example, UE 302 may first determine a PRACH CE level at which to attempt a RACH procedure (e.g., based on RSRP of SSB compared to thresholds Thr1, Thr2, Thr3, etc., as described above with respect to FIG. 6), and may then determine the frequency hopping pattern at 720 based on the determined PRACH CE level. As noted above, the frequency hopping pattern may optionally be determined based on a frequency hop indication from the base station (e.g., received via SIB, etc.).

Referring to FIG. 7, at 730, UE 302 (e.g., transmitter 314 or 324, etc.) transmits the first PRACH preamble in accordance with the frequency hopping pattern and the associated PRACH CE level. In an example, the transmission of the first PRACH preamble may be transmitted on a first transmit beam at a first transmission power level. As will be described below in more detail, the frequency hopping pattern may include an intra-band frequency hopping pattern with intra-band frequency hopping between different parts of a BW (e.g., 5 MHz BW) supported by the UE, or the frequency hopping pattern comprises an inter-band frequency hopping pattern with inter-band frequency hopping between different BWs (e.g., different 5 MHz BWs) supported by the UE, or a combination thereof. In some designs, the BW associated with the intra-band frequency hopping pattern may correspond to a bandwidth part (BWP), although this is not required.

Referring to FIG. 7, at 740, UE 302 (e.g., transmitter 314 or 324, etc.) optionally transmits a second PRACH preamble in accordance with the frequency hopping pattern. In an example, the second PRACH preamble is optional because, if the first PRACH preamble is successful, the second PRACH preamble need not be performed. In some designs, a transmission beam can be changed between PRACH preamble transmissions to facilitate beam diversity (e.g., base station may be able to hear UE 302 more easily over certain beams, depending on channel conditions, etc.). In this case, the second PRACH preamble may be transmitted on a second transmit beam that is different than the first transmit beam.

Referring to FIG. 7, at 750, in an example where the PRACH preamble is part of a 4-Step RACH procedure, UE 302 (e.g., receiver 312 or 322, etc.) optionally receives a Msg2 physical downlink shared channel (PDSCH) including an uplink grant that indicates a repetition level for a Msg3 from the UE. In other designs, the Msg3 repetition need not be indicated via Msg2 PDSCH uplink grant (e.g., the repetition level can be set to some default level based on PRACH CE level, etc.).

Referring to FIG. 7, at 760, UE 302 (e.g., transmitter 314 or 324, etc.) optionally transmits the Msg3 in accordance with the indicated repetition level (e.g., from the optional Msg2 PDSCH at 750). In an example, assume that two or more PRACH preamble transmissions are performed in accordance with a beam sweeping pattern. In this case, two or more Msg3 transmission repetitions at 760 may likewise be performed in accordance with the same beam sweeping pattern (e.g., beam sweeping pattern to a successful PRACH preamble transmission attempt is carried over to Msg3 so as to improve Msg3 transmission).

Figure 8:
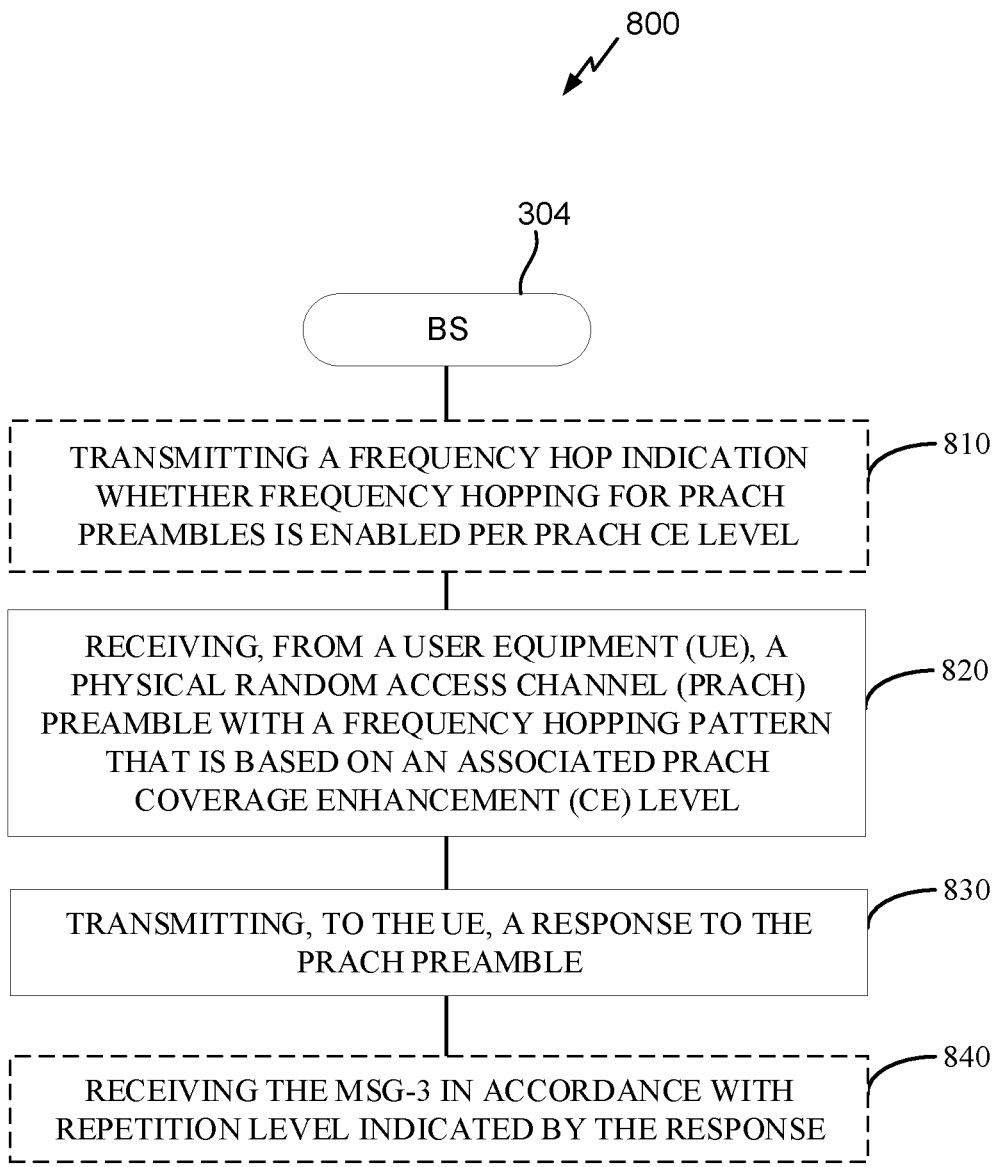
FIG. 8 illustrates an exemplary process of communications according to an aspect of the disclosure.

FIG. 8 illustrates an exemplary process 800 of communications according to an aspect of the disclosure. The process 800 of FIG. 8 is performed by a BS, which may correspond to BS 304 as an example.

Referring to FIG. 8, at 810, BS 304 (e.g., transmitter 354 or 364, etc.) optionally transmits a frequency hop indication that indicates whether frequency hopping for PRACH preambles is enabled per PRACH CE level. In an example, the frequency hop indication is transmitted via SIB. In a more specific example, the SIB corresponds to a SIB1 or a SIB associated with a class of the UE (e.g., SIB specific to NR-Superlight UEs, etc.). In an example, the frequency hop indication may be optional in some designs because UEs may alternatively assume that PRACH preamble frequency hopping per PRACH CE level is enabled.

Referring to FIG. 8, at 820, BS 304 (e.g., receiver 352 or 362, etc.) receives, from a UE (e.g., UE 302), a PRACH preamble with a frequency hopping pattern that is based on an associated PRACH CE level. As will be described below in more detail, the frequency hopping pattern may include an intra-band frequency hopping pattern with intra-band frequency hopping between different parts of a BW (e.g., 5 MHz BW) supported by the UE, or the frequency hopping pattern comprises an inter-band frequency hopping pattern with inter-band frequency hopping between different BWs (e.g., different 5 MHz BWs) supported by the UE, or a combination thereof. In some designs, the BW associated with the intra-band frequency hopping pattern may correspond to a bandwidth part (BWP), although this is not required.

Referring to FIG. 8, at 830, BS 304 (e.g., transmitter 354 or 364, etc.) transmits, to the UE, a response to the PRACH preamble. For example, if the RACH procedure is a 2-Step RACH procedure, then the response transmitted at 830 may correspond to MsgB. Alternatively, if the RACH procedure is a 4-Step RACH procedure, then the response transmitted at 830 may correspond to Msg2.

Referring to FIG. 8, at 840, BS 304 (e.g., transmitter 354 or 364, etc.) optionally (e.g., in case of 4-Step RACH) receives a Msg3 in accordance with repetition level indicated by the response (e.g., Msg2) from 830. For example, the response at 830 may include a Msg2 PDSCH with an uplink grant that indicates a repetition level for a Msg3 from the UE. In this case, the Msg3 may be received with the indicated repetition level. In other designs, the Msg3 repetition need not be indicated via Msg2 PDSCH uplink grant (e.g., the repetition level can be set to some default level based on PRACH CE level, etc.).

Figure 9:
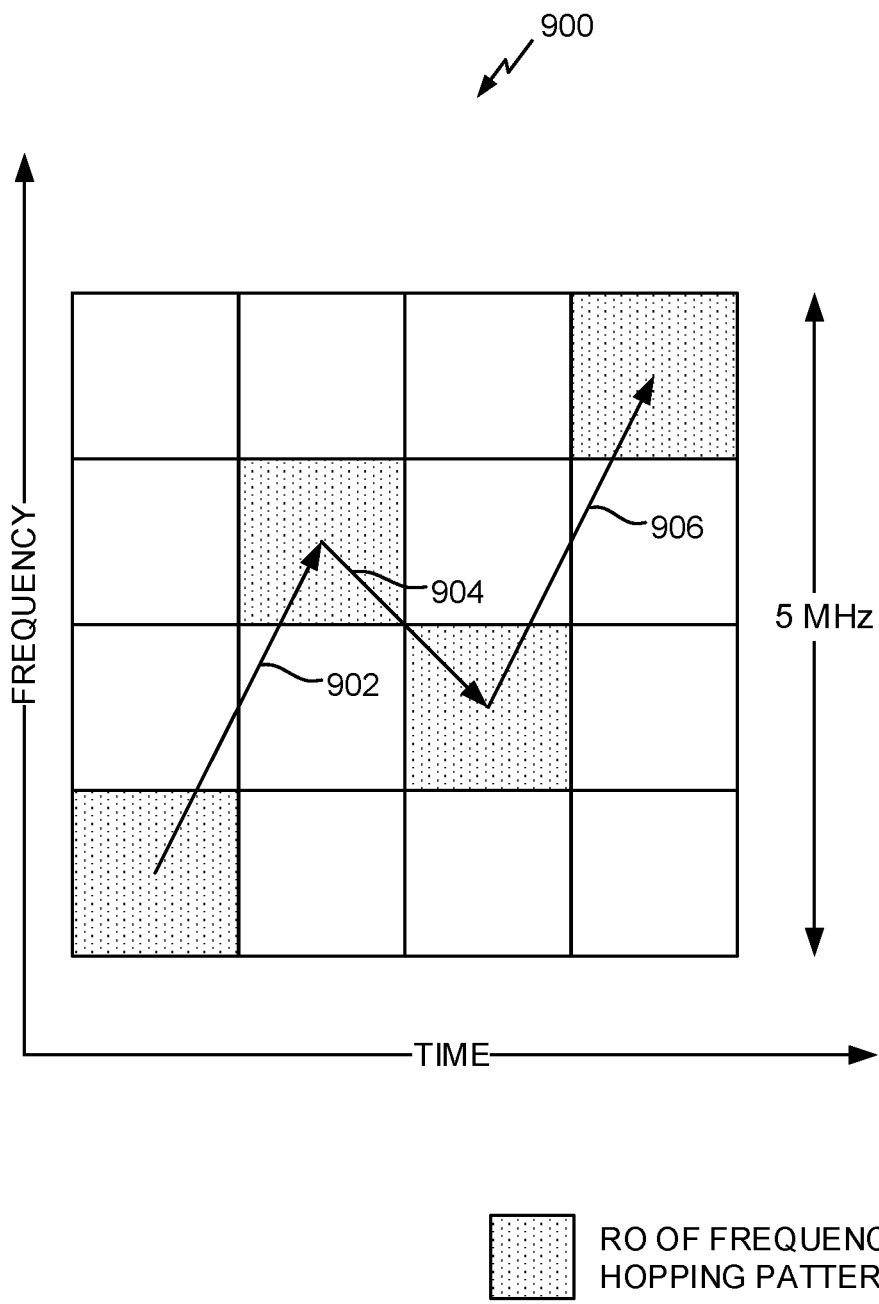
FIG. 9 illustrates an intra-band frequency hopping pattern in accordance with an example implementation of the processes of FIGS. 7-8.
Figure 10:
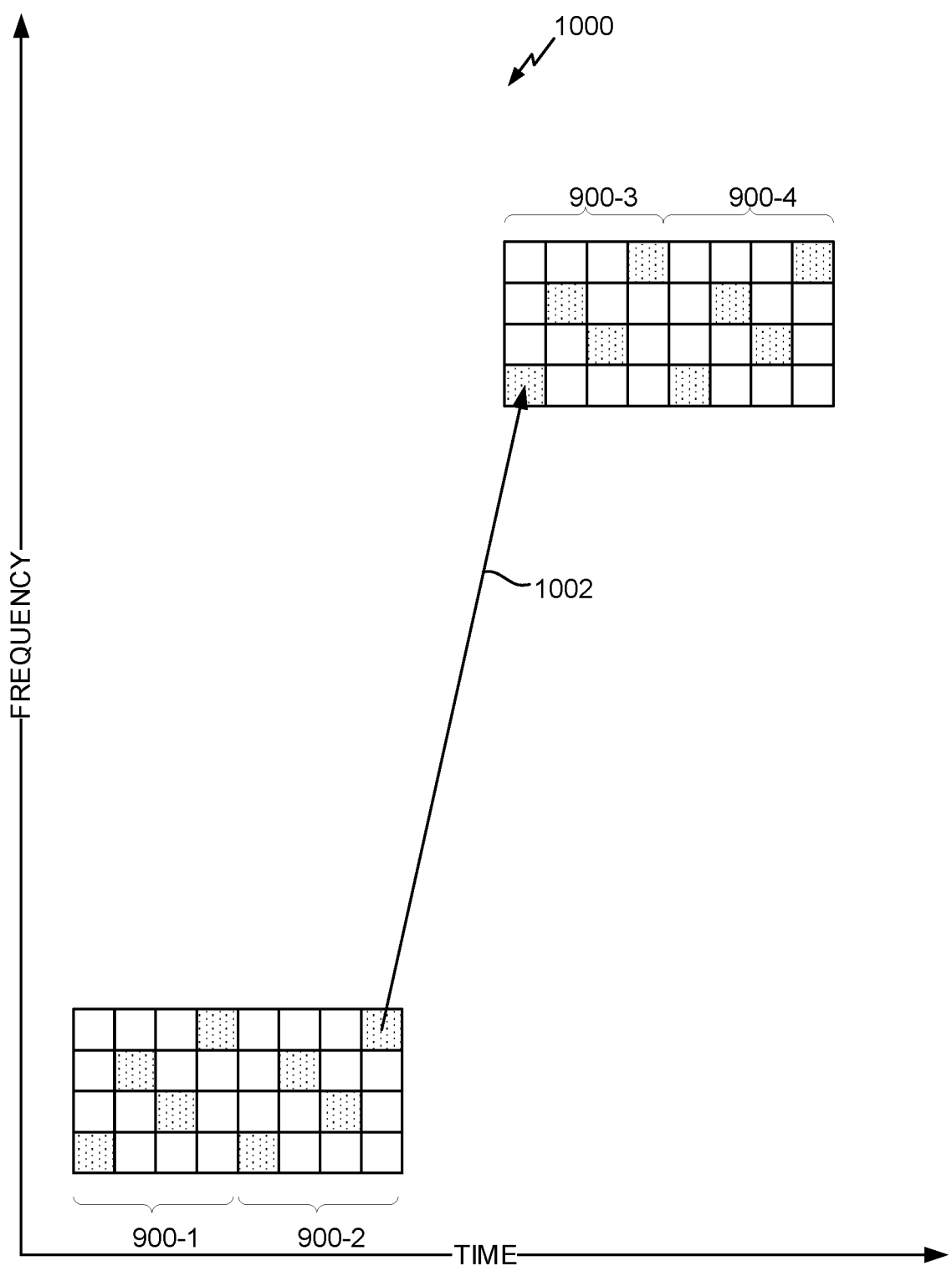
FIG. 10 illustrates frequency hopping pattern that includes both an intra-frequency hopping pattern and an inter-frequency hopping pattern in accordance with an example implementation of the processes of FIGS. 7-8.

Referring to FIGS. 7-8, as noted above, the frequency hopping pattern comprises an intra-band frequency hopping pattern with intra-band frequency hopping between different parts of a BW supported by the UE, as depicted in FIGS. 9-10 by way of example.

FIG. 9 illustrates an intra-band frequency hopping pattern 900 in accordance with an example implementation of the processes 700-800 of FIGS. 7-8. In FIG. 9, hops between four (4) ROs are depicted within a BW of 5 MHz, via frequency hopping pattern 902-904-906. Each RO in this example has a bandwidth of 1.25 MHz in frequency domain for PRACH format 0/1/2, and may be associated with 15 KHz subcarrier spacing (SCS) or 30 KHz SCS. In the example depicted in FIG. 9, each frequency hop of the frequency hopping pattern 902-904-906 is between two ROs associated with different frequencies. As noted above, intra-band frequency hopping may be used to facilitate frequency diversity even within a relatively small BW such as 5 MHz, and as such may improve PRACH preamble transmission for BW-limited UEs such as NR-Superlight UEs. While the intra-band frequency hopping pattern 900 includes four hops (i.e., hops 902-904-906, plus the initial hop to the initial RO), other designs may be implemented to N intra-frequency hops (e.g., 4, 5, 6, etc.), where N may be pre-defined or network-configured. In some designs, the BW associated with the intra-band frequency hopping pattern may correspond to a bandwidth part (BWP), although this is not required.

FIG. 10 illustrates frequency hopping pattern 1000 that includes both an intra-frequency hopping pattern and an inter-frequency hopping pattern in accordance with an example implementation of the processes 700-800 of FIGS. 7-8. In FIG. 10, 2 repetitions of the intra-band frequency hopping pattern 900 (denoted as 900-1 and 900-2) are performed at BW #1. Then, an inter-frequency hop 1002 is performed from BW #1 to BW #2, and 2 repetitions of the intra-band frequency hopping pattern 900 (denoted as 900-3 and 900-4) are then performed at BW #2. Accordingly, two or more repetitions of the intra-band frequency hopping pattern in a first BW, followed by an inter-band hop to a second BW in accordance with the inter-band frequency hopping pattern. This process may repeat between BW #1 and BW #2 (and/or other BWs) any number of times with additional inter-frequency hops. Hence, the frequency hopping pattern may include two or more repetitions of the intra-band frequency hopping pattern, the inter-band frequency hopping pattern, or a combination thereof.

Referring to FIGS. 7-8, in some designs, the first PRACH preamble may be transmitted on a first transmit beam at a first transmission power level, and a second PRACH preamble in accordance with the frequency hopping pattern, with the second PRACH preamble being transmitted on a second transmit beam at a second transmission power level that is higher than the first transmission power level. In other words, if transmission beam sweeping is applied, power ramping may be performed in the next transmission attempt (e.g., next SSB mapped PRACH resources) even though the transmission beam changes. By contrast, in some legacy systems such as 3GPP Rel. 16 systems, no PRACH preamble power ramping is applied if there is a transmission beam change.

Figure 11:
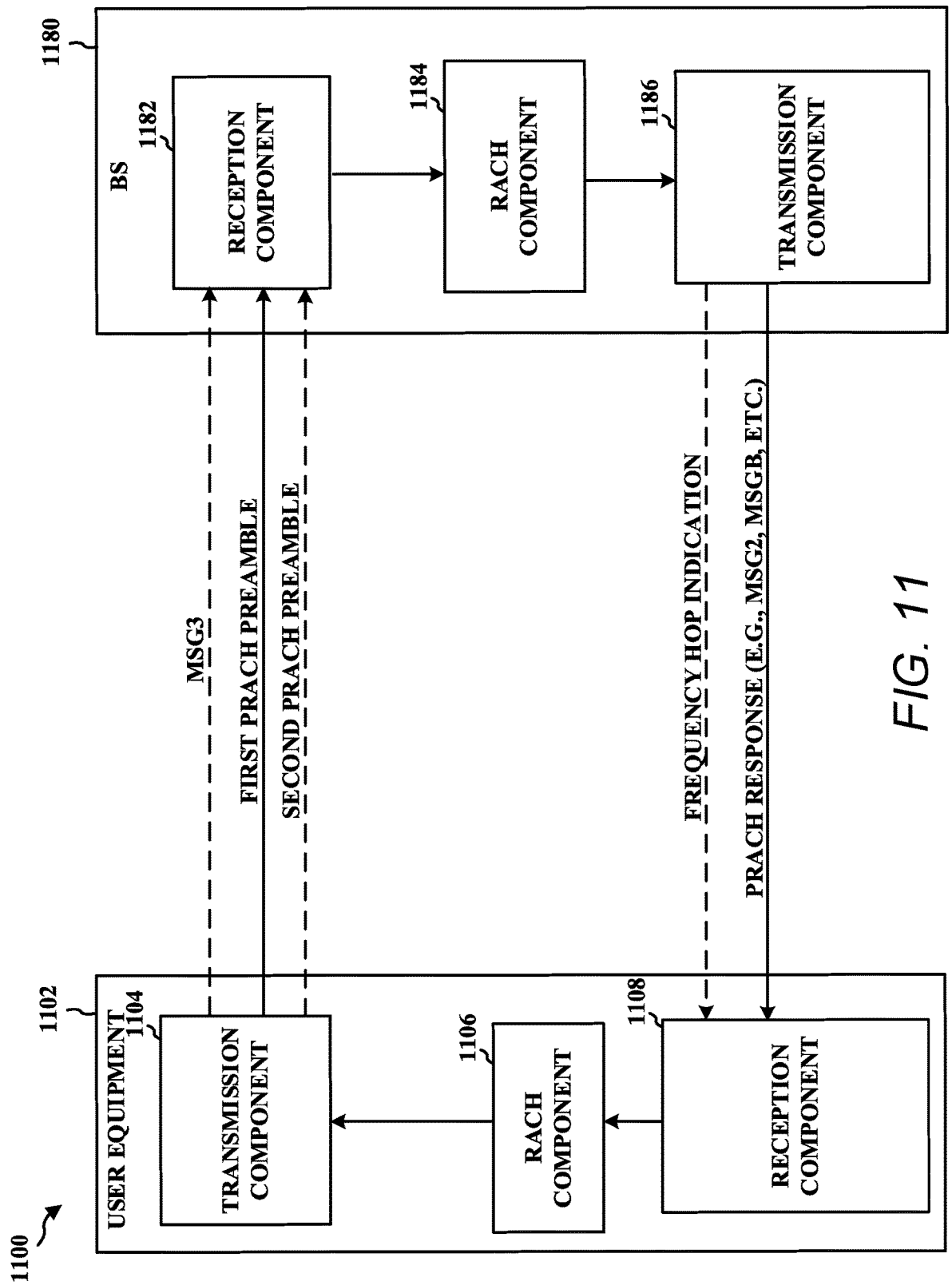
FIG. 11 is a conceptual data flow diagram illustrating the data flow between different means/components in exemplary apparatuses in accordance with an aspect of the disclosure.

FIG. 11 is a conceptual data flow diagram 1100 illustrating the data flow between different means/components in exemplary apparatuses 1102 and 1180 in accordance with an aspect of the disclosure. The apparatus 1102 may be a UE (e.g., UE 302) in communication with an apparatus 1180, which may be a base station (e.g., BS 304).

The apparatus 1102 includes a transmission component 1104, which may correspond to transmitter circuitry in UE 302 as depicted in FIG. 3A, including transmitter(s) 314 and 324, antenna(s) 316 and 326, etc. The apparatus 1102 further includes RACH component 1106, which may correspond to processor circuitry in UE 302 as depicted in FIG. 3A, including processing system 332, etc. The apparatus 1102 further includes a reception component 1108, which may correspond to receiver circuitry in UE 302 as depicted in FIG. 3A, including receiver(s) 312 and 322, antenna(s) 316 and 326, etc.

The apparatus 1180 includes a transmission component 1186, which may correspond to transmitter circuitry in BS 304 as depicted in FIG. 3B, including transmitter(s) 354 and 364, antenna(s) 356 and 366, etc. The apparatus 1180 further includes RACH component 1184, which may correspond to processor circuitry in BS 304 as depicted in FIG. 3B, including processing system 384, etc. The apparatus 1180 further includes a reception component 1182, which may correspond to receiver circuitry in BS 304 as depicted in FIG. 3B, including receiver(s) 352 and 362, antenna(s) 356 and 366, etc.

Referring to FIG. 11, the transmission component 1104 optionally transmits a frequency hop indication to the reception component 1182, which forwards the optional frequency hop indication to the RACH component 1184. The RACH component 1184 determines a frequency hopping pattern for PRACH preamble transmission (e.g., based on optional frequency hop indication) based on a PRACH CE level associated with the PRACH preamble transmission. The transmission component 1104 transmits a first PRACH preamble in accordance with the frequency hopping pattern, which may be received at the reception component 1182. If the first PRACH preamble is unsuccessful, the transmission component 1104 may optionally transmit a second PRACH preamble. Once a PRACH preamble is received at the reception component 1182, the RACH component 1184 directs the transmission component 1186 to transmit a PRACH response (e.g., Msg2 in case of 4-Step RACH, or MsgA in case of 2-Step RACH). The transmission component 1104 optionally transmits Msg3 (e.g., in case of 4-Step RACH), at a repetition level indicated by Msg2 and/or via same beam sweeping pattern as PRACH preamble.

One or more components of the apparatus 1102 and apparatus 1180 may perform each of the blocks of the algorithm in the aforementioned flowcharts of FIGS. 7-8. As such, each block in the aforementioned flowcharts of FIGS. 7-8 may be performed by a component and the apparatus 1102 and apparatus 1180 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
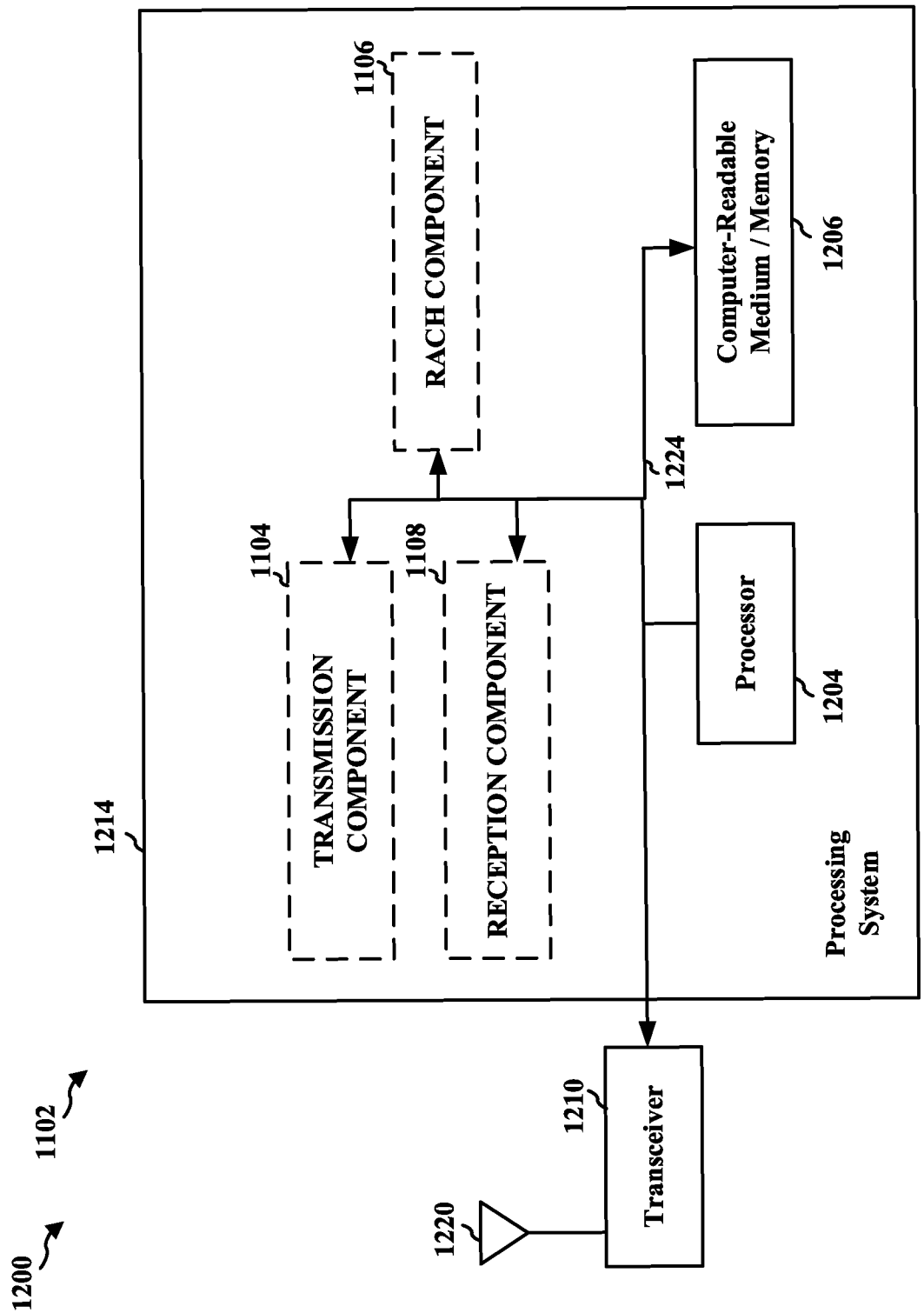
FIGS. 12-13 are diagrams illustrating examples of hardware implementations for apparatuses employing processing systems.

FIG. 12 is a diagram 1200 illustrating an example of a hardware implementation for an apparatus 1102 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106 and 1108, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1108. In addition, the transceiver 1210 receives information from the processing system 1214, specifically the transmission component 1104, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106 and 1108. The components may be software components running in the processor 1204, resident/stored in the computer readable medium/memory 1206, one or more hardware components coupled to the processor 1204, or some combination thereof.

In one configuration, the apparatus 1102 (e.g., a UE) for wireless communication includes means for determining a frequency hopping pattern for transmission of a first physical random access channel (PRACH) preamble based on an associated PRACH coverage enhancement (CE) level, and means for transmitting the first PRACH preamble in accordance with the frequency hopping pattern and the associated PRACH CE level.

The aforementioned means may be one or more of the aforementioned components of the apparatus 1102 and/or the processing system 1214 of the apparatus 1102 configured to perform the functions recited by the aforementioned means.

Figure 13:
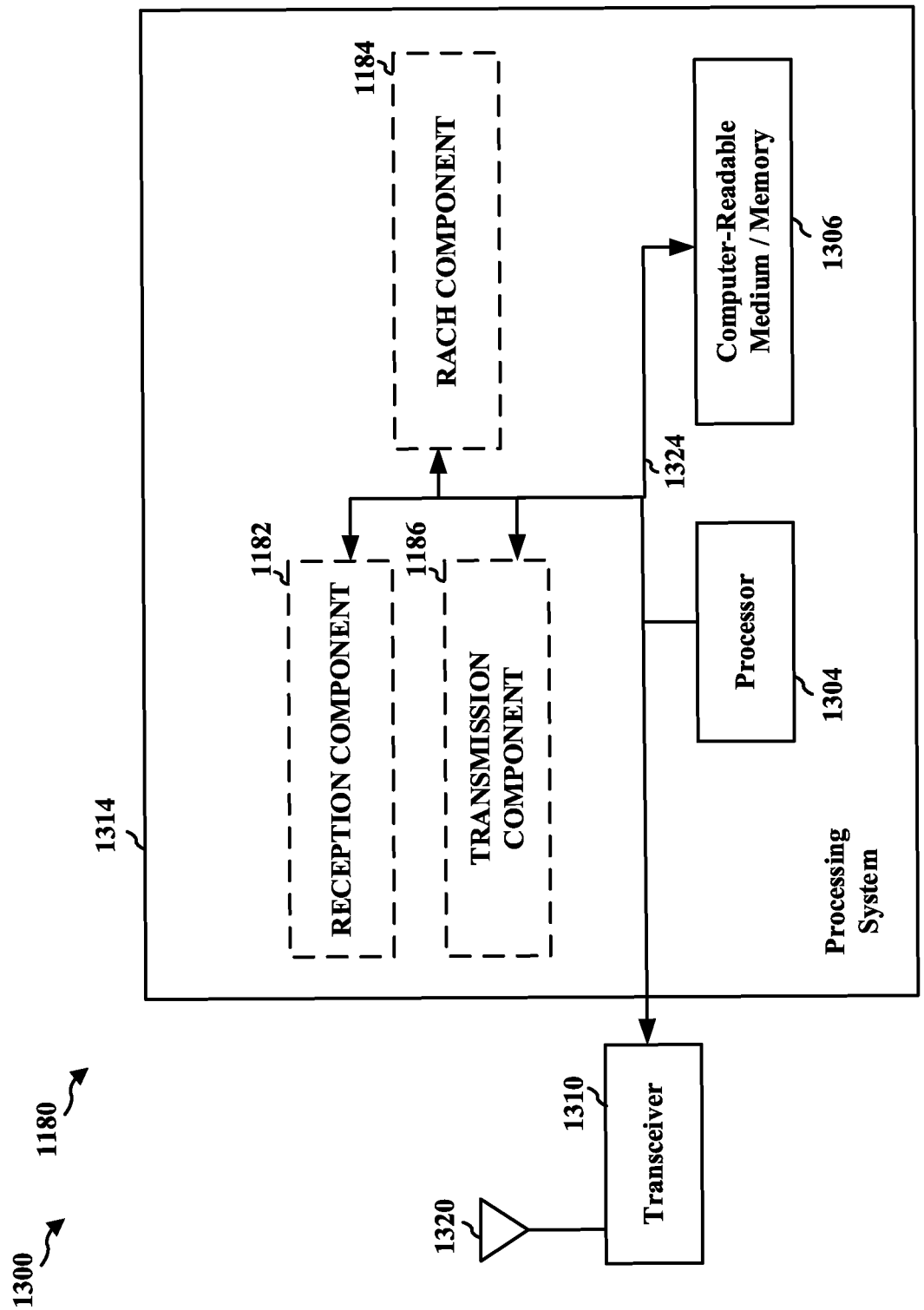

FIG. 13 is a diagram 1300 illustrating an example of a hardware implementation for an apparatus 1180 employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1182, 1184 and 1186, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1182. In addition, the transceiver 1310 receives information from the processing system 1314, specifically the transmission component 1186, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1182, 1184 and 1186. The components may be software components running in the processor 1304, resident/stored in the computer readable medium/memory 1306, one or more hardware components coupled to the processor 1304, or some combination thereof.

In one configuration, the apparatus 1180 (e.g., a BS) for wireless communication may include means for receiving, from a user equipment (UE), a physical random access channel (PRACH) preamble with a frequency hopping pattern that is based on an associated PRACH coverage enhancement (CE) level, and means for transmitting, to the UE, a response to the PRACH preamble.

The aforementioned means may be one or more of the aforementioned components of the apparatus 1180 and/or the processing system 1314 of the apparatus 1180 configured to perform the functions recited by the aforementioned means.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE), comprising: determining a frequency hopping pattern for transmission of a first physical random access channel (PRACH) preamble based on an associated PRACH coverage enhancement (CE) level; and transmitting the first PRACH preamble in accordance with the frequency hopping pattern and the associated PRACH CE level.

Clause 2. The method of clause 1, wherein the frequency hopping pattern comprises an intra-band frequency hopping pattern with intra-band frequency hopping between different parts of a bandwidth (BW) supported by the UE, or wherein the frequency hopping pattern comprises an inter-band frequency hopping pattern with inter-band frequency hopping between different BWs supported by the UE, or a combination thereof.

Clause 3. The method of clause 2, wherein the frequency hopping pattern comprises: two or more repetitions of the intra-band frequency hopping pattern in a first BW, followed by an inter-band hop to a second BW in accordance with the inter-band frequency hopping pattern.

Clause 4. The method of any of clauses 2 to 3, wherein the frequency hopping pattern comprises two or more repetitions of the intra-band frequency hopping pattern, the inter-band frequency hopping pattern, or a combination thereof.

Clause 5. The method of any of clauses 1 to 4, wherein each frequency hop of the frequency hopping pattern is associated with a different RACH occasion (RO).

Clause 6. The method of any of clauses 1 to 5, wherein each frequency hop of the frequency hopping pattern is associated with the same RACH occasion (RO).

Clause 7. The method of any of clauses 1 to 6, further comprising: receiving a frequency hop indication that indicates frequency hopping for PRACH preambles is enabled by a base station per PRACH CE level.

Clause 8. The method of clause 7, wherein the frequency hop indication is received in a system information block (SIB) from the base station.

Clause 9. The method of clause 8, wherein the SIB corresponds to a SIB1 or a SIB associated with a class of the UE.

Clause 10. The method of any of clauses 7 to 9, wherein the frequency hop indication indicates whether inter-band frequency hopping, intra-band frequency hopping, or both, are enabled by the base station per PRACH CE level.

Clause 11. The method of any of clauses 1 to 10, wherein the first PRACH preamble is transmitted on a first transmit beam at a first transmission power level, further comprising: transmitting a second PRACH preamble in accordance with the frequency hopping pattern, wherein the second PRACH preamble is transmitted on a second transmit beam at a second transmission power level that is higher than the first transmission power level.

Clause 12. The method of any of clauses 1 to 11, wherein the RACH procedure corresponds to a 2-Step RACH procedure.

Clause 13. The method of any of clauses 1 to 12, wherein the RACH procedure is a 4-Step RACH procedure, further comprising: receiving a Msg2 physical downlink shared channel (PDSCH) comprising an uplink grant that indicates a repetition level for a Msg3 from the UE.

Clause 14. The method of clause 13, further comprising: transmitting the Msg3 in accordance with the indicated repetition level.

Clause 15. The method of any of clauses 13 to 14, wherein two or more PRACH preamble transmissions are performed in accordance with a beam sweeping pattern, and wherein two or more Msg3 transmission repetitions are performed in accordance with the beam sweeping pattern.

Clause 16. A method of operating a base station, comprising: receiving, from a user equipment (UE), a physical random access channel (PRACH) preamble with a frequency hopping pattern that is based on an associated PRACH coverage enhancement (CE) level; and transmitting, to the UE, a response to the PRACH preamble.

Clause 17. The method of clause 16, wherein the frequency hopping pattern comprises an intra-band frequency hopping pattern with intra-band frequency hopping between different parts of a bandwidth (BW) supported by the UE, or wherein the frequency hopping pattern comprises an inter-band frequency hopping pattern with inter-band frequency hopping between different BWs supported by the UE, or a combination thereof.

Clause 18. The method of clause 17, wherein the frequency hopping pattern comprises: two or more repetitions of the intra-band frequency hopping pattern in a first BW, followed by an inter-band hop to a second BW in accordance with the inter-band frequency hopping pattern.

Clause 19. The method of any of clauses 17 to 18, wherein the frequency hopping pattern comprises two or more repetitions of the intra-band frequency hopping pattern, the inter-band frequency hopping pattern, or a combination thereof.

Clause 20. The method of any of clauses 16 to 19, wherein each frequency hop of the frequency hopping pattern is associated with a different RACH occasion (RO).

Clause 21. The method of any of clauses 16 to 20, wherein each frequency hop of the frequency hopping pattern is associated with the same RACH occasion (RO).

Clause 22. The method of any of clauses 16 to 21, further comprising: transmitting a frequency hop indication that indicates whether frequency hopping for PRACH preambles is enabled per PRACH CE level, wherein the PRACH preamble is received from the UE in response to the frequency hop indication.

Clause 23. The method of clause 22, wherein the frequency hop indication is transmitted in a system information block (SIB) from the base station.

Clause 24. The method of clause 23, wherein the SIB corresponds to a SIB1 or a SIB associated with a class of the UE.

Clause 25. The method of any of clauses 22 to 24, wherein the frequency hop indication indicates whether inter-band frequency hopping, intra-band frequency hopping, or both, are enabled by the base station per PRACH CE level.

Clause 26. The method of any of clauses 16 to 25, wherein the RACH procedure corresponds to a 2-Step RACH procedure.

Clause 27. The method of any of clauses 16 to 26, wherein the RACH procedure is a 4-Step RACH procedure, and wherein the response to the PRACH preamble comprises a Msg2 physical downlink shared channel (PDSCH) with an uplink grant that indicates a repetition level for a Msg3 from the UE.

Clause 28. The method of clause 27, further comprising: receiving the Msg3 in accordance with the indicated repetition level.

Clause 29. An apparatus comprising a memory, a communication interface, and at least one processor communicatively coupled to the memory and the communication interface, the memory, the communication interface, and the at least one processor configured to perform a method according to any of clauses 1 to 28.

Clause 30. An apparatus comprising means for performing a method according to any of clauses 1 to 28.

Clause 31. A non-transitory computer-readable medium storing computer-executable instructions, the computer-executable comprising at least one instruction for causing a computer or processor to perform a method according to any of clauses 1 to 28.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a user equipment (UE), comprising:

determining a frequency hopping pattern for transmission of a first physical random access channel (PRACH) preamble based on an associated PRACH coverage enhancement (CE) level; and transmitting the first PRACH preamble in accordance with the frequency hopping pattern and the associated PRACH CE level, wherein the frequency hopping pattern comprises two or more repetitions of an intra-band frequency hopping pattern with intra-band frequency hopping between different parts of a first bandwidth (BW), followed by an inter-band hop to a second BW in accordance with an inter-band frequency hopping pattern, or wherein the first PRACH preamble is transmitted on a first transmit beam at a first transmission power level, a second PRACH preamble is transmitted in accordance with the frequency hopping pattern, and the second PRACH preamble is transmitted on a second transmit beam at a second transmission power level that is higher than the first transmission power level.

2. The method of claim 1, wherein the frequency hopping pattern further comprises two or more repetitions the inter-band frequency hopping pattern.

3. The method of claim 1, wherein two or more frequency hops of the frequency hopping pattern are associated with different RACH occasions (ROs).

4. The method of claim 1, wherein two or more frequency hops of the frequency hopping pattern are associated with the same RACH occasion (RO).

5. The method of claim 1, further comprising:
receiving a frequency hop indication that indicates frequency hopping for PRACH preambles is enabled by a network component per PRACH CE level.

6. The method of claim 5, wherein the frequency hop indication is received in a system information block (SIB) from the network component.

7. The method of claim 6, wherein the SIB corresponds to a SIB1 or a SIB associated with a class of the UE.

8. The method of claim 5, wherein the frequency hop indication indicates whether inter-band frequency hopping, the intra-band frequency hopping, or both, are enabled by the network component per PRACH CE level.

9. The method of claim 1, wherein the first PRACH preamble is associated with a 2-Step RACH procedure.

10. The method of claim 1,
wherein the first PRACH preamble is associated with a 4-Step RACH procedure, further comprising:
receiving a Msg2 physical downlink shared channel (PDSCH) comprising an uplink grant that indicates a repetition level for a Msg3 from the UE.

11. The method of claim 10, further comprising:
transmitting the Msg3 in accordance with the indicated repetition level.

12. The method of claim 10,
wherein two or more PRACH preamble transmissions are performed in accordance with a beam sweeping pattern, and
wherein two or more Msg3 transmission repetitions are performed in accordance with the beam sweeping pattern.

13. A method of operating a network component, comprising:
receiving, from a user equipment (UE), a physical random access channel (PRACH) preamble with a frequency hopping pattern that is based on an associated PRACH coverage enhancement (CE) level; and transmitting, to the UE, a response to the PRACH preamble,
wherein the frequency hopping pattern comprises two or more repetitions of an intra-band frequency hopping pattern with intra-band frequency hopping between different parts of a first bandwidth (BW), followed by an inter-band hop to a second BW in accordance with an inter-band frequency hopping pattern.

14. The method of claim 13, wherein the frequency hopping pattern further comprises two or more repetitions the inter-band frequency hopping pattern.

15. The method of claim 13, wherein two or more frequency hops of the frequency hopping pattern are associated with different RACH occasions (ROs).

16. The method of claim 13, wherein two or more frequency hops of the frequency hopping pattern are associated with the same RACH occasion (RO).

17. The method of claim 13, further comprising:
transmitting a frequency hop indication that indicates whether frequency hopping for PRACH preambles is enabled per PRACH CE level,
wherein the PRACH preamble is received from the UE in response to the frequency hop indication.

18. The method of claim 17, wherein the frequency hop indication is transmitted in a system information block (SIB) from the network component.

19. The method of claim 18, wherein the SIB corresponds to a SIB1 or a SIB associated with a class of the UE.

20. The method of claim 17, wherein the frequency hop indication indicates whether the inter-band frequency hopping, intra-band frequency hopping, or both, are enabled by the network component per PRACH CE level.

21. The method of claim 13, wherein the PRACH preamble is associated with a 2-Step RACH procedure.

22. The method of claim 13,
wherein the PRACH preamble is associated with a 4-Step RACH procedure, and
wherein the response to the PRACH preamble comprises a Msg2 physical downlink shared channel (PDSCH) with an uplink grant that indicates a repetition level for a Msg3 from the UE.

23. The method of claim 22, further comprising:
receiving the Msg3 in accordance with the indicated repetition level.

24. A user equipment (UE), comprising:
a memory;
a communication interface; and
at least one processor communicatively coupled to the memory and the communication interface, the at least one processor configured to:
determine a frequency hopping pattern for transmission of a first physical random access channel (PRACH) preamble based on an associated PRACH coverage enhancement (CE) level; and
cause the communication interface to transmit the first PRACH preamble in accordance with the frequency hopping pattern and the associated PRACH CE level,
wherein the frequency hopping pattern comprises two or more repetitions of an intra-band frequency hopping pattern with intra-band frequency hopping between different parts of a first bandwidth (BW), followed by an inter-band hop to a second BW in accordance with an inter-band frequency hopping pattern, or
wherein the first PRACH preamble is transmitted on a first transmit beam at a first transmission power level, the at least one processor is further configured to transmit a second PRACH preamble in accordance with the frequency hopping pattern, wherein the second PRACH preamble is transmitted on a second transmit beam at a second transmission power level that is higher than the first transmission power level.

25. A network component, comprising:

a memory;

a communication interface; and at least one processor communicatively coupled to the memory and the communication interface, the at least one processor configured to:

cause the communication interface to receive, via the communication interface, from a user equipment (UE), a physical random access channel (PRACH) preamble with a frequency hopping pattern that is based on an associated PRACH coverage enhancement (CE) level; and cause the communication interface to transmit, to the UE, a response to the PRACH preamble, wherein the frequency hopping pattern comprises two or more repetitions of an intra-band frequency hopping pattern with intra-band frequency hopping between different parts of a first bandwidth (BW), followed by an inter-band hop to a second BW in accordance with an inter-band frequency hopping pattern.

* * * * *